Sept. 23, 1941.    E. S. HINELINE    2,257,012
SHUTTER ACTUATING MECHANISM, PARTICULARLY FOR REFLEX CAMERAS
Original Filed Aug. 5, 1939    12 Sheets-Sheet 1
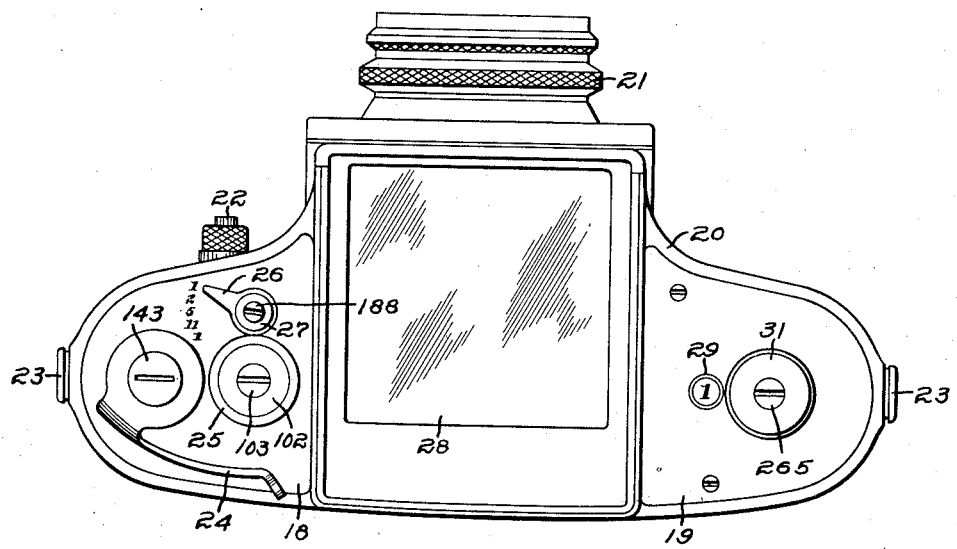
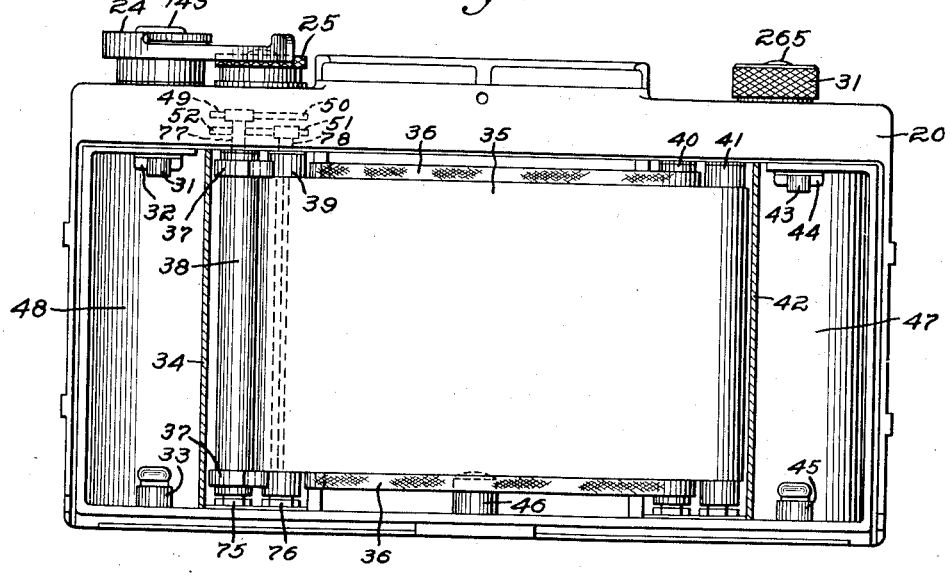
Inventor:
Edson S. Hineline,
by [signature]
Attys.

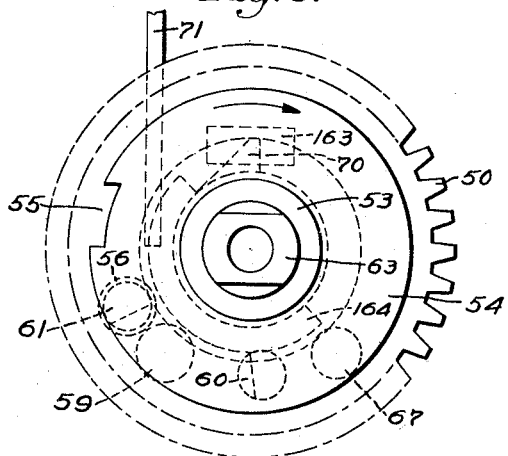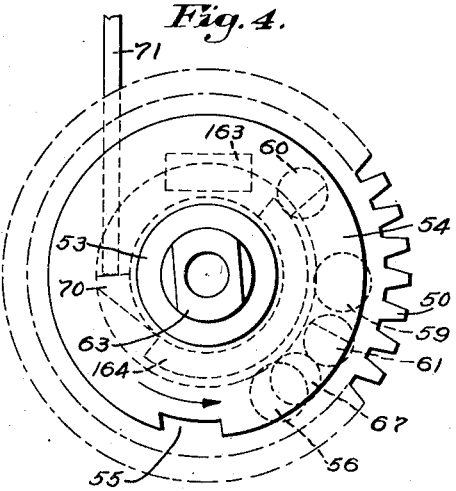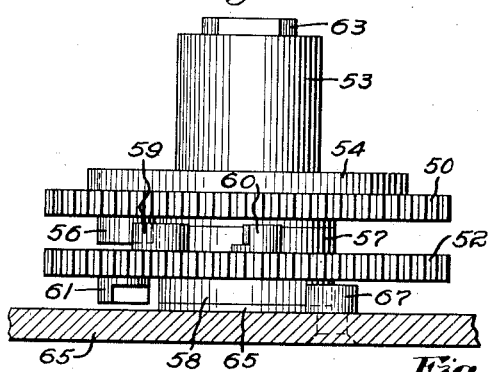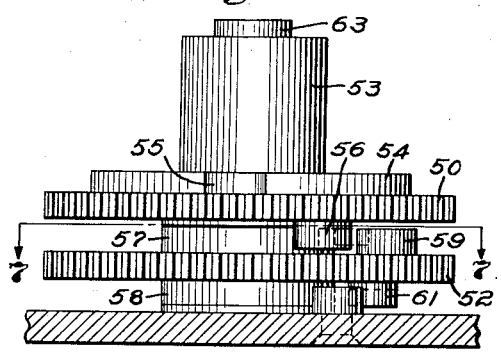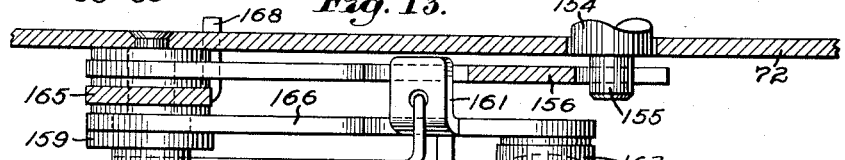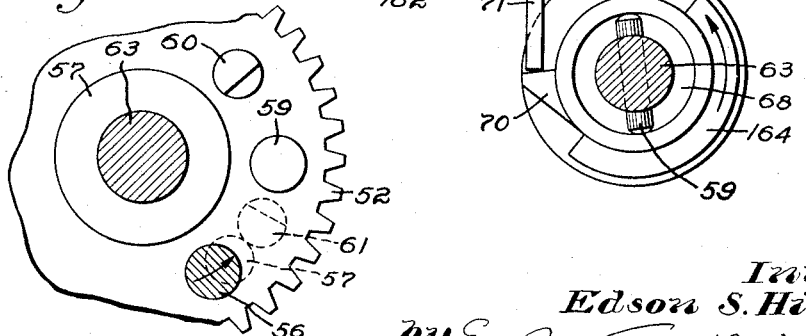

Sept. 23, 1941.  E. S. HINELINE  2,257,012
SHUTTER ACTUATING MECHANISM, PARTICULARLY FOR REFLEX CAMERAS
Original Filed Aug. 5, 1939  12 Sheets—Sheet 3
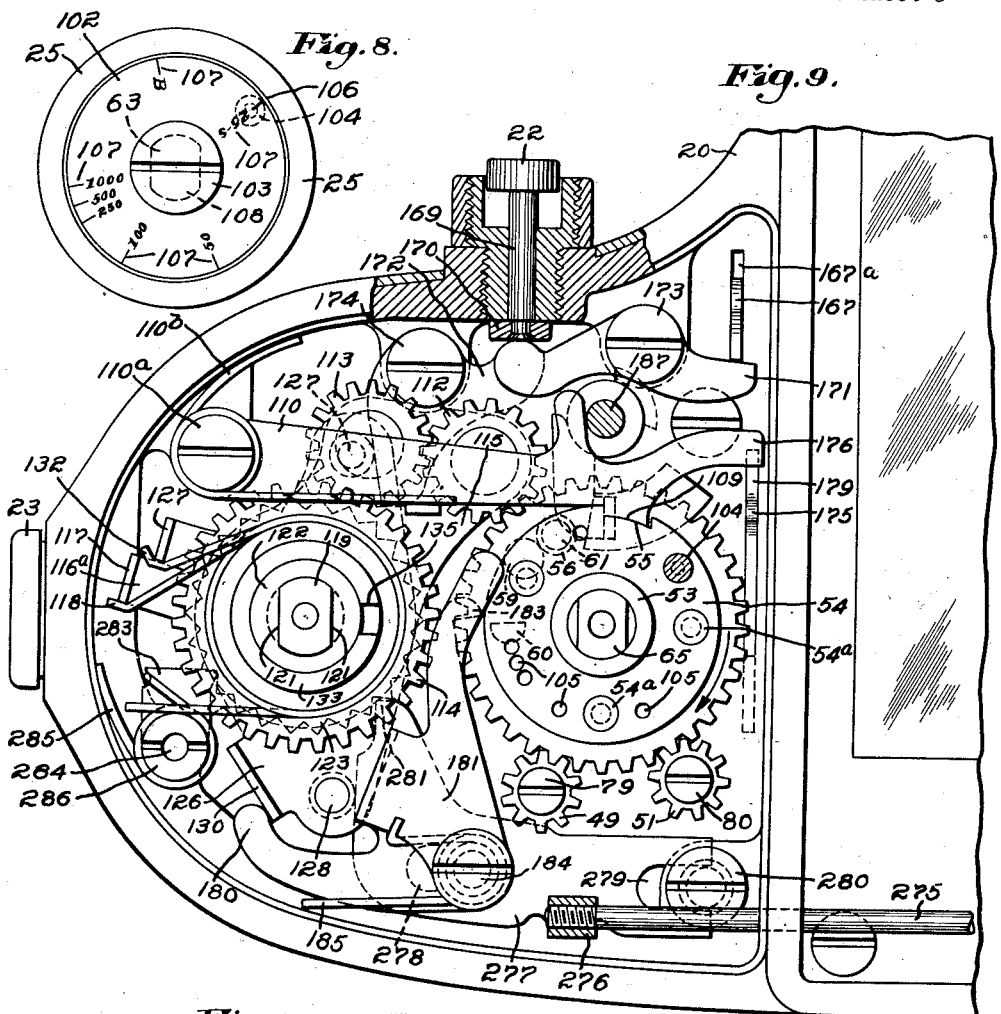
Inventor:
Edson S. Hineline,
by Emery Booth, Townsend, Miller and Knighton
Attys.

Sept. 23, 1941.  E. S. HINELINE  2,257,012
SHUTTER ACTUATING MECHANISM, PARTICULARLY FOR REFLEX CAMERAS
Original Filed Aug. 5, 1939  12 Sheets-Sheet 4

Inventor:
Edson S. Hineline,
by Emery, Booth, Thomas, Miller and Lindner
Attys

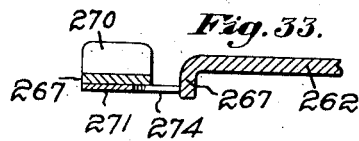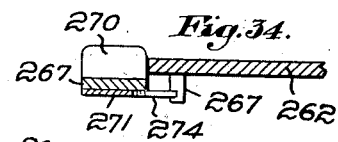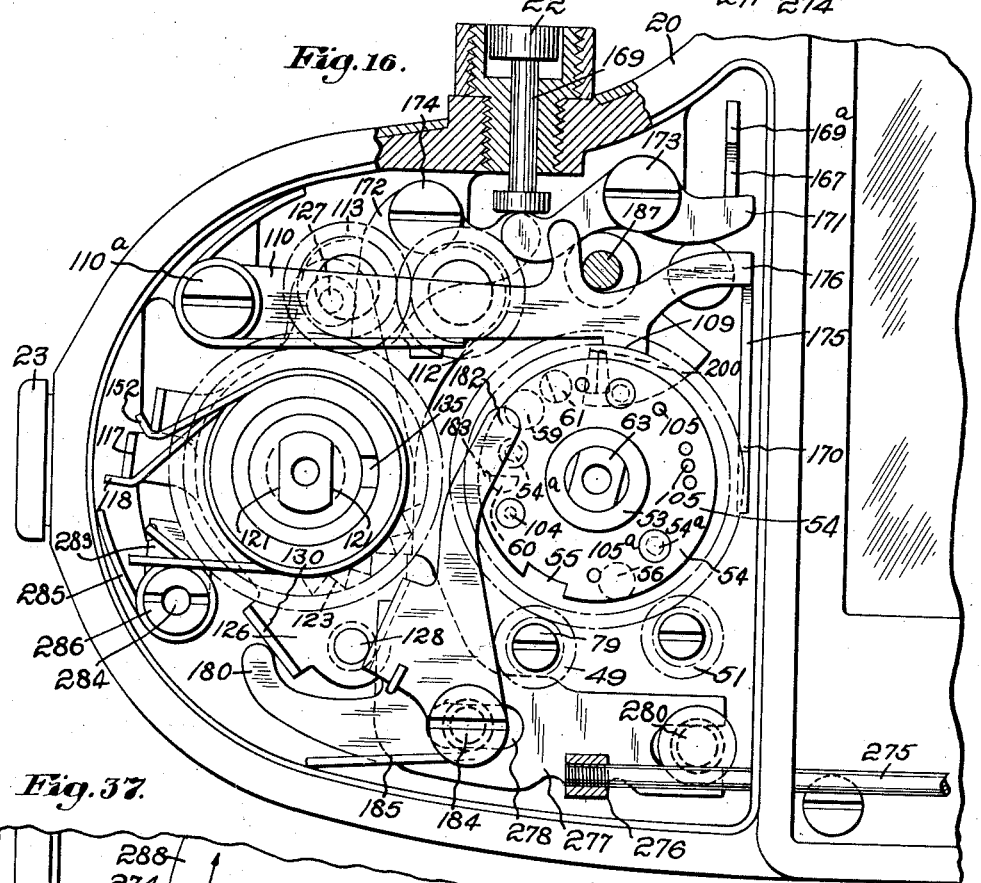

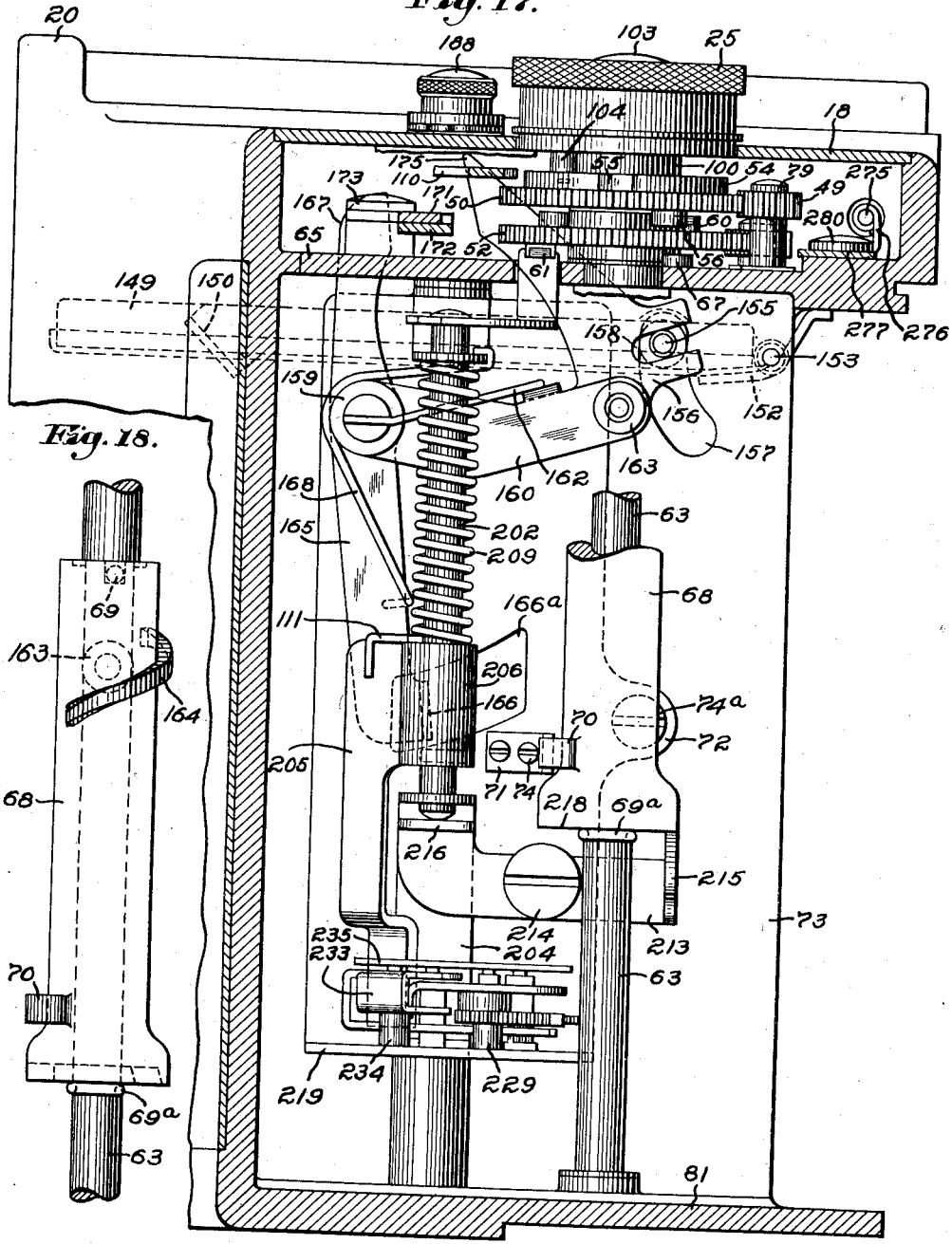

Sept. 23, 1941.  E. S. HINELINE  2,257,012
SHUTTER ACTUATING MECHANISM, PARTICULARLY FOR REFLEX CAMERAS
Original Filed Aug. 5, 1939   12 Sheets-Sheet 7
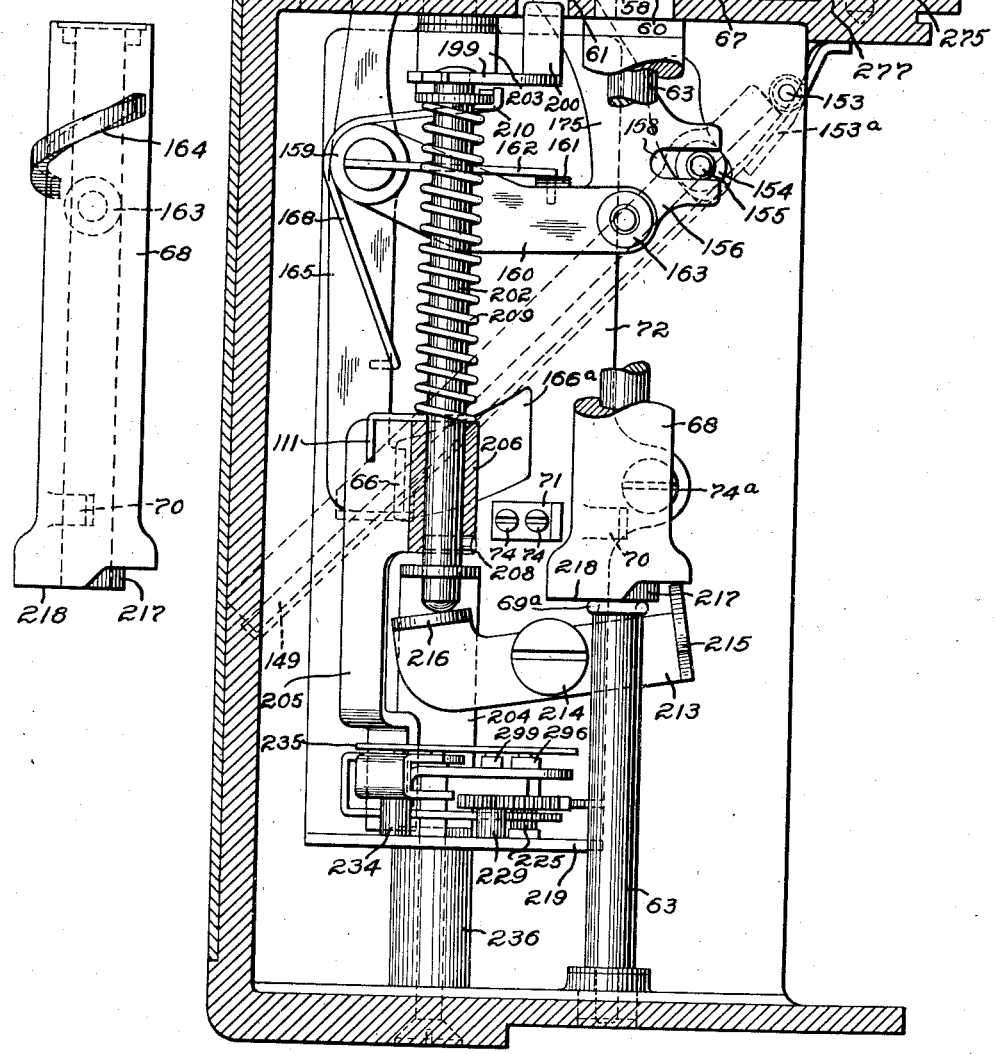
Inventor:
Edson S. Hineline,
Attys.

Sept. 23, 1941.  E. S. HINELINE  2,257,012
SHUTTER ACTUATING MECHANISM, PARTICULARLY FOR REFLEX CAMERAS
Original Filed Aug. 5, 1939   12 Sheets-Sheet 8
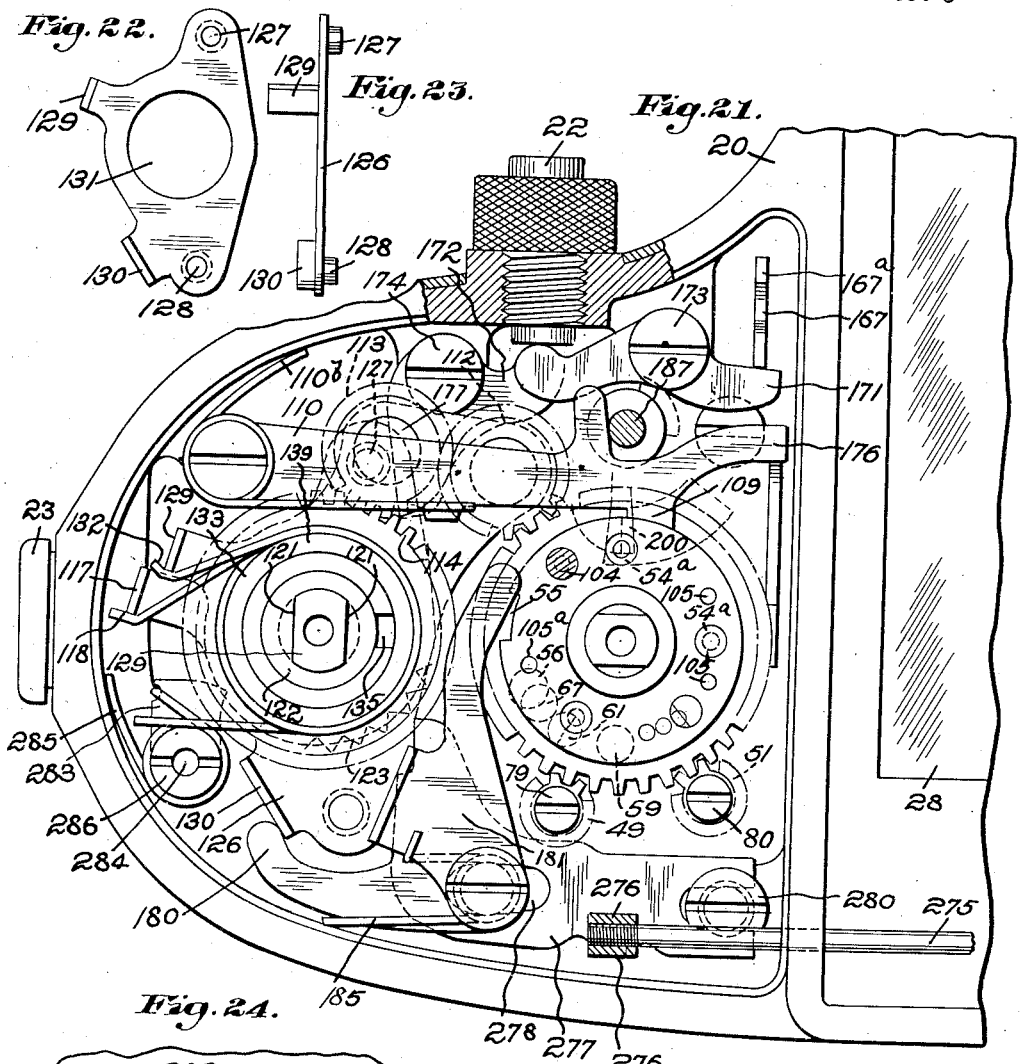
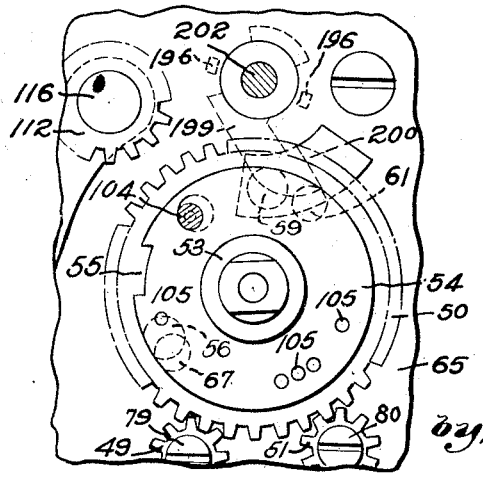
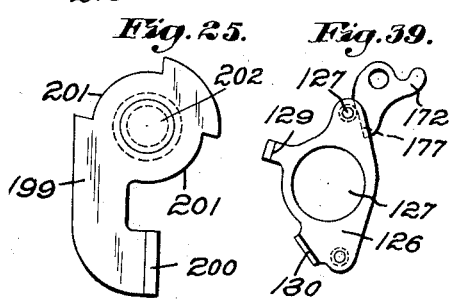
Inventor:
Edson S. Hineline,
by [signature]
Attys.

Sept. 23, 1941. E. S. HINELINE 2,257,012
SHUTTER ACTUATING MECHANISM, PARTICULARLY FOR REFLEX CAMERAS
Original Filed Aug. 5, 1939 12 Sheets-Sheet 9
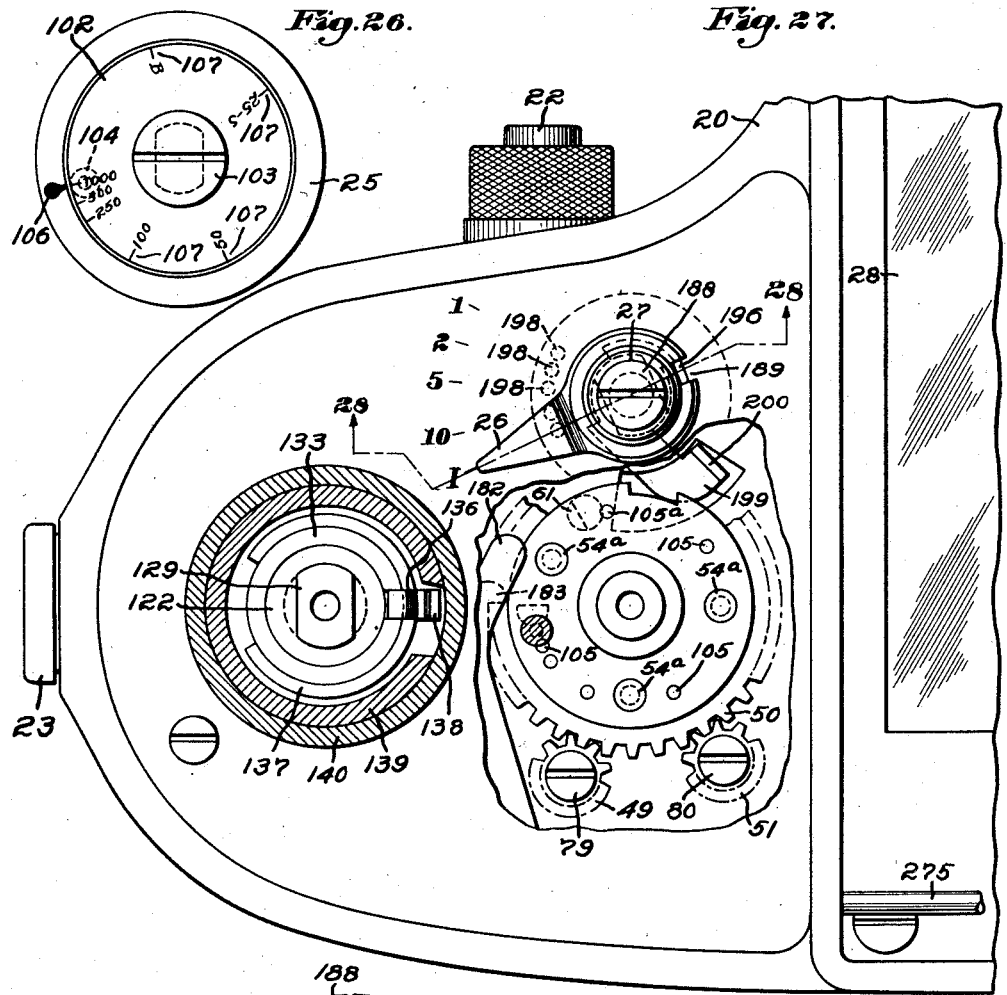
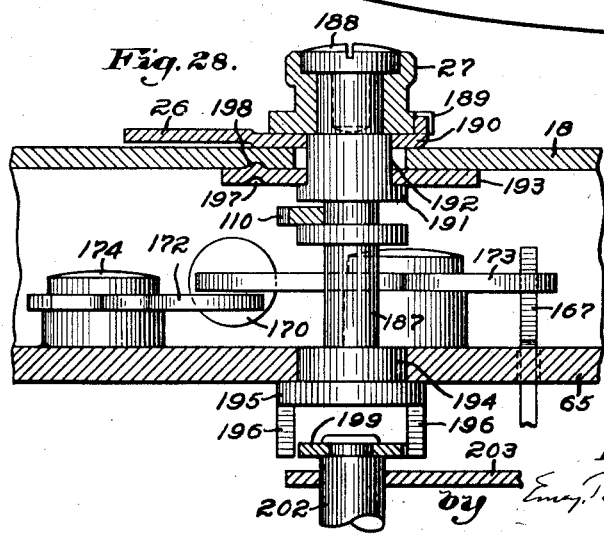
Inventor:
Edson S. Hineline,
by Emery, Booth, Townsend, Mather & Lapham
Attys.

Sept. 23, 1941.　　　E. S. HINELINE　　　2,257,012
SHUTTER ACTUATING MECHANISM, PARTICULARLY FOR REFLEX CAMERAS
Original Filed Aug. 5, 1939　　12 Sheets-Sheet 10

Inventor:
Edson S. Hineline,
by Attys.

Sept. 23, 1941.  E. S. HINELINE  2,257,012
SHUTTER ACTUATING MECHANISM, PARTICULARLY FOR REFLEX CAMERAS
Original Filed Aug. 5, 1939   12 Sheets-Sheet 11

Inventor:
Edson S. Hineline,
by Emery, Booth, Townsend, Miller and Langton
Attys.

Inventor.
Edson S. Hineline,

Patented Sept. 23, 1941

2,257,012

UNITED STATES PATENT OFFICE 2,257,012

SHUTTER ACTUATING MECHANISM, PARTICULARLY FOR REFLEX CAMERAS

Edson S. Hineline, Rochester, N. Y., assignor to The Folmer Graflex Corporation, Rochester, N. Y., a corporation of Delaware Original application August 5, 1939, Serial No. 288,505. Divided and this application January 28, 1941, Serial No. 376,306

18 Claims. (Cl. 95—57)

This application is an exact division of my copending application Ser. No. 288,505, filed August 5, 1939, now Patent No. 2,233,345, dated February 25, 1941, and is filed in compliance with an official requirement for division. However, owing to the intimate relation of the subject matter of this divided-out invention to that of said original application, it is necessary to reproduce in their entirety the original specification and drawings.

This invention relates to photographic cameras of novel construction lending itself to modern manufacturing practices.

In order that the principle of the invention may be readily understood, I have disclosed a single embodiment or example thereof in the accompanying drawings, wherein Fig. 1 is a top plan view of the camera showing the location of the various controls;

Fig. 2 is a rear view of Fig. 1 with the film-loading door removed;

Fig. 3 is a top plan view of the curtain gear assembly and release cam plate when the first curtain is fully wound to re-set position;

Fig. 4 is a top plan view of the curtain winding gear and release cam plate in the position occupied when the first curtain has fully run down;

Fig. 5 is a detail of the curtain rewind gear assembly when the curtains are fully wound, being a side elevation of Fig. 3;

Fig. 6 is a view similar to Fig. 5 when the curtains are fully run down, being in substance a side elevation of Fig. 4;

Fig. 7 is a section of Fig. 6 on the line 7—7 thereof;

Fig. 8 is an enlarged detail in plan of the shutter speed setting dial and knob;

Fig. 9 is a partial top plan view of the camera with the shutter mechanism plate removed to show the shutter mechanism in set condition;

Fig. 10 is a detail of the second curtain release lever;

Fig. 11 is an edge view of Fig. 10;

Fig. 12 is an enlarged detail of the idler gear pivot plate;

Fig. 13 is a detail in section showing the mirror reset mechanism;

Fig. 16 is a top plan view similar to Fig. 9, wherein the shutter has been released and the first curtain has run all the way down;

Fig. 17 is a vertical transverse section through the camera showing the position of the mirror after it has been released and the relation of its associated parts;

Fig. 18 is a detail of the mirror reset cam member, the first curtain having run all the way down;

Fig. 19 is a vertical transverse section through the camera showing the position of the mechanism when the shutter has been rewound and is ready for a second exposure;

Fig. 20 is an enlarged detail of the mirror reset cam member in the position it occupies when the mechanism is positioned as in Fig. 19;

Fig. 21 is a top plan view similar to Fig. 9, both curtains, however, having been released and run all the way down;

Fig. 22 is an enlarged detail of the bulb exposure rocker arm;

Fig. 23 is an edge view of Fig. 22;

Fig. 24 is a plan view of part of the shutter mechanism showing the position of the slow shutter speed retarding lever when the retarding lever is about to release the second curtain;

Fig. 25 is an enlarged detail of the slow shutter speed retarding lever;

Fig. 26 is a plan view similar to Fig. 8, excepting that the dial has been moved to indicate a speed of .001 second;

Fig. 27 is an enlarged plan view with a part of the shutter winding mechanism cut away to more clearly show the construction of the rewinding friction drive, a section of the shutter plate having been cut away to show more clearly the operation of some of the parts;

Fig. 28 is an enlarged detail assembly in transverse section showing the relation of the slow shutter speed dial and its associated mechanism;

Fig. 33 is a sectional detail of Fig. 37 on the broken line 33—33 thereof;

Fig. 34 is a section through Fig. 38 on the broken line 34—34 thereof;

Fig. 37 is an enlarged detail of the film measuring mechanism when in condition to allow the rewinding of film to the position of first exposure;

Fig. 38 is an enlarged detail showing the condition of the film measuring or spacing mechanism during rewinding of film, but before the interlocking mechanism has commenced to function; and Fig. 39 is a detail of a bulb operating rocker arm and a cooperating bell crank.

Figure 14:
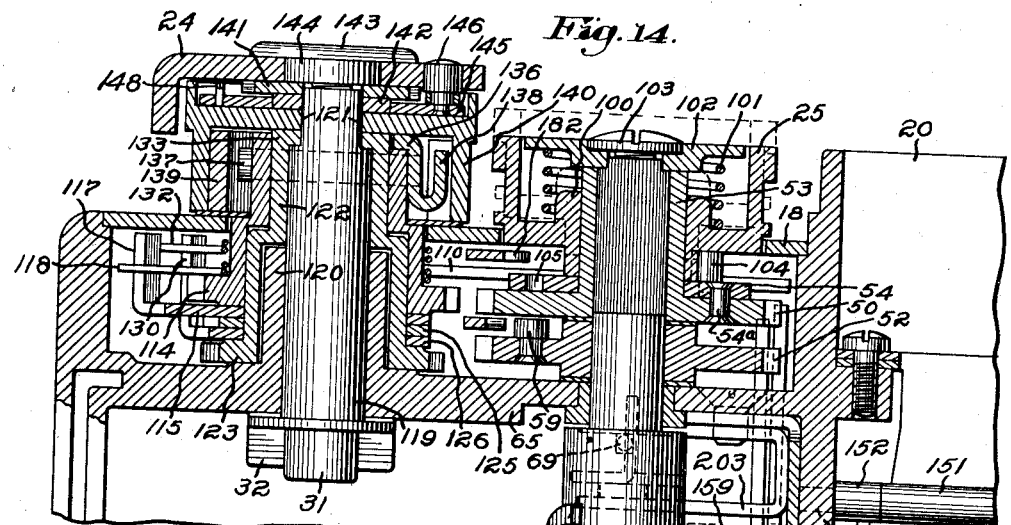
Fig. 14 is a vertical transverse section through the shutter and film transport mechanism, showing its relationship to the mirror reset mechanism.

Important objects of my invention are to provide a camera, particularly of the reflex type, with a self-capping shutter that is rewound automatically with the winding of the film, to provide means for obtaining slow shutter speeds without the manipulation of auxiliary winding knobs and to provide shutter rewinding mechanism interlocking with the film feeding mechanism, to prevent the possibility of double exposure.

I shall refer first to the general construction of operating parts shown in Figs. 1 and 2. Therein the shutter cover plate is indicated at 18, the index mechanism cover plate at 19, the camera body at 20, the objective lens at 21, the release button at 22, the camera back latches at 23, 23, the film winding lever at 24, 24, the shutter setting or shutter winding knob at 25, the slow shutter speed pointer at 26, the slow shutter speed knob at 27, the ground glass screen at 28, the exposure frame window at 29 and the counter dial knob at 30.

The take-up spool shaft is indicated at 31 in Fig. 2 and elsewhere, the take-up spool driving dogs at 32, the take-up spool shaft at 33, and the take-up spool housing at 34. The camera is provided with two curtains of which the No. 1 curtain is indicated at 35 and the No. 2 curtain at 35A. The No. 2 curtain ribbons are indicated at 36, 36, and the No. 1 curtain ribbons at 37, 37. The first or No. 1 curtain take-up roller is indicated at 38 and the second or No. 2 curtain take-up roller at 39. The tension roller for the second curtain is indicated at 40, and the tension roller for the first curtain is indicated at 41. The take-off spool housing is indicated at 42, the take-off spool shaft at 43, the take-off spool driving dog at 44, the take-off spool stud shaft at 45 and the tripod socket at 46.

In the use of the camera, a spool of sensitized material customarily referred to as the film is placed in a film chamber 47 indicated at the right in Fig. 2. The film is led across back of the camera onto a take-up spool in the spool chamber 48, and is caused to be wound up by the action of the winding lever 24, as will be more fully described hereinafter.

*Shutter and shutter winding.*—The shutter used in the camera herein disclosed is similar to the shutter disclosed in my earlier co-pending application Ser. No. 271,335, Patent No. 2,242,124, May 13, 1941 but it differs therefrom principally in the control means therefor. The shutter does, however, employ the two curtains 35, 35A, respectively shown most clearly in Figs. 2 and 29.

The position of the said two curtains, when the camera mechanism is in condition for making an exposure, is clearly shown in Fig. 2, wherein the curtain ribbons 37, 37 of the first curtain 35 are entirely wound up on the spool or roller 38, the second curtain 35A being wound up on spool or roller 39. Said first curtain 35 is also attached to curtain roller 41 and second curtain ribbons 36, 36 are attached to curtain tension roller 40. The curtain roller or spool 38 is provided with a pinion 49 shown in dotted lines in Fig. 2, as meshing with the curtain winding gear 50 shown in dotted lines in Fig. 2 and upon a larger scale in Figs. 3, 4, 5 and elsewhere. The curtain spool or roller 39 is provided with a pinion 51, shown in dotted lines in Fig. 2 as meshing with curtain winding gear 52, also shown in dotted lines in Fig. 2, and shown upon a larger scale in Figs. 6 and 7 and elsewhere. The said pinions 49 and 51 and the curtain winding gears 50 and 52 are most clearly shown in Fig. 17, enlarged details being, however, shown in Figs. 3 to 7.

As shown in Fig. 5, the curtain winding gear 50 has attached a hub 53 and cam plate 54 is also attached by rivets 54a (Fig. 9). Cam plate 54 has a notch 55 clearly shown in Figs. 3 and 4. Gear 50 also has a stud or pin 56 hereinafter referred to. Gear 52 has an upper hub 57, a lower hub 58, a rewind pin 59, release pin 60 and slow shutter control pin 61. Gear 50 is carried on shaft 63 and keyed thereto by means of a spline clearly shown in Fig. 14. Gear 52 is free to rotate on shaft 63 through a part of a revolution, and is separated from gear 50 by a suitable thrust washer and from mechanism-housing lower plate 65 by thrust washer 66. A stop pin 67 is attached to mechanism-housing plate 65, as clearly shown in Figs. 5 and 6. The purpose of stop pin 67 is to engage pin 61 in gear 52 when the second curtain has traveled its full distance.

The purpose of pin 56 on curtain-winding gear 50 and rewind pin 59 on curtain winding gear 52 is to cause said gear 52 to be carried with gear 50 when gear 50 is turned in a contraclockwise direction to rewind the shutter curtain. Pins 56 and 59 serve also to hold the second curtain when the shutter is in an entirely rewound condition. Attached to the lower part of shaft 63, as shown in Figs. 14, 17 and 19, is a cam member 68 keyed to shaft 63 by pin 69 and held in place with lock ring 69a (Figs. 17 and 19). The said cam member 68 carries a dog 70 which engages with stop member 71 attached to mechanism bracket 72 and camera wall 73 (Figs. 14, 17, 29, 30, etc.) with screws 74, 74, most clearly shown in Fig. 17. The purpose of this stop is to limit the motion of the first curtain winding gear 50 at the completion of its travel.

Again referring to Fig. 2, the curtain take-up roller 38 is provided on its lower end with a formation (not shown) engaging a bearing 75. The second curtain take-up roller 39 is also provided with a formation engaging a bearing 76 at its lower end. The first curtain roller 38 is provided with an extending shaft 77 and the second curtain roller 39 is provided with an upwardly extending shaft 78, both shown in dotted lines in Fig. 2. The pinion 49 is attached to said shaft 77 by means of a spline (not shown) and held thereon by screw 79, most clearly shown in Fig. 9, and shaft 78 is provided with a pinion 51, best shown in Fig. 9 as attached in a like manner and held by a screw 80. The construction of the curtain tension rollers 40, 41 is most clearly shown in Fig. 36, wherein the camera bottom plate is indicated at 81, the tension roller bearing at 82, the tension roller bearing lock nut at 83, the curtain roller bushing at 84, the curtain roller tension shaft at 85 and the curtain roller tension spring at 86, the latter having one end engaging a hole 87 in the shaft 85. The other end engages a hole 88 in curtain roller bushing 89. Said curtain roller bushings 84 and 89 are attached to curtain roller 40 and are held integral therewith. Curtain tension shaft 85 has an upwardly extending end provided with threads 90 passing through a hole 91 in the upper camera wall 92 and is engaged by a shoulder screw or nut 93. Shaft 85 is also provided with a shoulder 94 which engages washer 95. A second washer 96 is fitted over the upper end 90 of shaft 85. This structure provides a ready means of adjusting curtain-roller tension, which is accomplished by engaging a screw driver in slot 96a of shaft 85 after having first loosened nut 93, which also has a slotted head 97. The shaft 85 then can be turned in a clockwise direction to increase the tension of the spring 86. When sufficient tension is obtained, the nut or shoulder screw 93 is turned in a clockwise direction, thus holding shaft 85 in a fixed position through the friction of washers 95 and 96 engaging camera wall 92. The curtain tension roller 41 is of similar construction, and therefore need not be described in detail.

Again referring to Fig. 2 (and Figs. 3 to 6), it will readily be understood that if gears 50 and 52 were caused to turn in a contraclockwise direction, pinion 49 meshing with gear 50 and pinion 51 meshing with gear 52 would be caused to turn in a clockwise direction as viewed from the top of the camera, thus winding up on curtain rollers 38 and 39 respectively, curtain tapes or ribbons 37 of the first curtain 35 and the second curtain 35A. The curtains will now appear as in Fig. 2 in the fully wound condition or in that condition just prior to making an exposure. When gear 50 is released in a manner hereinafter explained, pinion 49 meshing with gear 50 will be free to turn, and also the curtain roller 38 which is attached to gear 50 is free to turn and the first curtain 35 will then be wound up on curtain roller 41 under the influence of curtain roller spring 86. The construction of curtain roller 41 and spring 86 is most clearly shown in Fig. 36, already referred to. When gear 52 is released, pinion 51, which meshes therewith, is free to turn. The curtain roller 39 is also free to turn, thus allowing the second curtain 35A to be wound up on curtain roller 40 under the influence of spring 86.

However, means are provided to control the timing of the release of gear 52 with respect to the release of gear 50 so as to provide means for controlling the slot width between the first curtain 35 and second curtain 35A, and thus obtain exposures of different time (that is to say, to obtain a different slot width).

As previously stated, gear 50 is provided with a pin 56 and gear 52 is provided with pins 59, 60 and 61, all most clearly shown in Figs. 3, 4, 5, 6 and 7. Over the hub 53 of gear 50 is fitted the shutter speed knob 25, also shown in Figs. 1 and 2, and having a hub 100 most clearly shown in Fig. 14. Said knob 25 is caused to be thrust downwardly to the position shown in Fig. 14, under the influence of spring 101 (Fig. 14) until the end of hub 100 rests on cam plate 54 that is attached to gear 50. Spring 101 is held down by shutter setting dial 102 (Fig. 8) that is held to shaft 63 by shoulder screw 103. Said knob 25 is provided with a pin 104 which engages holes 105 and 105a of shutter plate 54, most clearly shown in Figs. 9, 21 and 24. The knob 25 can be raised to the position shown in dotted lines Fig. 14, and then revolved around the hub 53 until pin 104 engages any one of the holes 105 and 105a in cam plate 54. This constitutes means for changing the position of pin 104 with respect to gear 50 and cam plate 54. Said pin 104 also serves to key the knob 25 to the cam plate 54. Thus the knob 25 is caused to turn with cam plate 54. Said knob 25 is provided with an index mark 106. The index plate 102 is provided with a series of shutter speed designations 107, 107. This provides means for selecting the position of pin 104 with respect to cam plate 54. As shown in Figs. 9 and 14, the upper end of shaft 63 is provided with flats. The index plate 102 is provided with an opening 108 (Fig. 8) to fit over the upper end of shaft 63, and it is held in place by screw 103. Since curtain winding gear 50 is keyed to shaft 63 and cam plate 54 is riveted to gear 50 and index plate 102 is keyed to shaft 63, the relationship between cam plate 54 and index plate 102 will remain constant, but the knob 25 can be changed with respect to cam plate 54, and index mark 106 and shutter speed markings 107 clearly show what this relationship is at any time.

Fig. 6 shows the gear assembly in the condition in which the elements thereof will be when the shutter curtain 35, 35A are run all the way down. In such situation the pin 61 on the gear 52 will be held against pin 67 on mechanism housing plate 65 under the tension of shutter curtain 35A. As previously stated, said gear 50 is attached to shaft 63, and shaft 63 carries cam member 68 having a stop dog 70 held against stop 71 under the tension of curtain 35 and curtain ribbons 37. This construction is best shown in Fig. 4 in dotted lines, and also in Figs. 14 and 17. When shutter setting dial 25 is turned contraclockwise, it carries with it curtain winding gear 50 and cam plate 54 by means of pin 104 on knob 25 until the cam plate notch 55 reaches the position shown in Figs. 3 and 9. As the gear 50 is turned in a contraclockwise direction, the pin 56 is carried with gear 50 until it contacts with pin 59 on the gear 52, thus carrying said gear 52 with it until it is in the position shown in Fig. 5. When the notch 55 reaches the position shown in Fig. 9, an extended portion 109 of first curtain release lever 110 pivoted on shoulder screw 110a, will engage said notch 59 under the influence of a spring 110b, thus holding the cam plate 54, gear 50 and gear 52 in this position, which is the curtain reset or "ready" position. The shutter setting or winding knob 25 has been referred to as the means for restoring the first curtain 35 and second curtain 35A to the reset position, but in reality said knob 25 does not strictly serve this purpose, since the curtains 35 and 35A are reset through the medium of idler pinions 112 and 113 and shutter drive gear 114, shown in Figs. 9, 12, 14 and 21. The said idler pinions 112 and 113 are attached to a pivot plate 115 by means of shoulder rivets 116, 116, as shown in Fig. 12. The said pinion pivot plate 115 is provided with an extending arm 116a having an upturned end 117, and said plate 115 is caused to move in a clockwise direction under the influence of spring 118 (Fig. 9).

*Film winding.*—The construction of the film winding mechanism is shown in section in Fig. 14, wherein a shaft 119 passes through mechanism-bottom-plate 65 which has an upstanding portion 120 forming a bearing therefor. Said shaft 119 is provided with flats 121, 121 over which a ratchet sleeve 122 is placed, which has formed on its lower end a ratchet wheel 123. The pivot plate 115 of Fig. 12 is provided with a hole 124 for the purpose of fitting over the ratchet sleeve 122, and it is free to pivot thereon under the influence of spring 118. Beneath plate 115 is a spacing washer 125, and between washer 125 and the ratchet wheel 123 is fitted a bulb operating plate or rocker arm 126, a detail whereof is clearly shown in Figs. 22 and 23. Said plate 126 is provided with studs 127 and 128, upturned ends 129 and 130 and a hole 131. The ratchet sleeve 122 passes through hole 131, as clearly shown in Fig. 14. The operating plate 126 is caused to rotate in a clockwise direction under the influence of spring 132 coacting with the upturned end 129.

The extending sleeve 122 of the ratchet wheel 123 has fitted thereover the gear sleeve 133 of the gear 114. The said sleeve 133 is free to turn on sleeve 122. However, sleeve 133 is provided with a keyway 135, shown most clearly in Figs. 16 and 21, into which a key 136 of the clutch drive member 137 is fitted, which is also provided with a second keying means 138 engaging clutch spring 139, the latter being a cylindrical spring tending to open out against the inner wall of winding knob 140, as most clearly shown in Figs. 14 and 27.

As can be clearly seen from Fig. 27, if the film winding knob 140 is turned in a clockwise direction, the clutch spring 139 tends to travel with the winding knob 140 due to the pressure exerted by the said clutch spring, which carries with it the upturned portion 138 of keying member 137 and the inward turned portion of keying member 137. Since the key 136 engages slot 135 of the sleeve 133, the latter will also be caused to turn unless an undue load is placed on sleeve 133 and gear 114. Thus gear 114 can be stopped but the film winding knob 140 can continue to turn because of the friction engagement between it and the driving spring 139. The purpose of this provision will be more fully disclosed presently.

Figure 32:
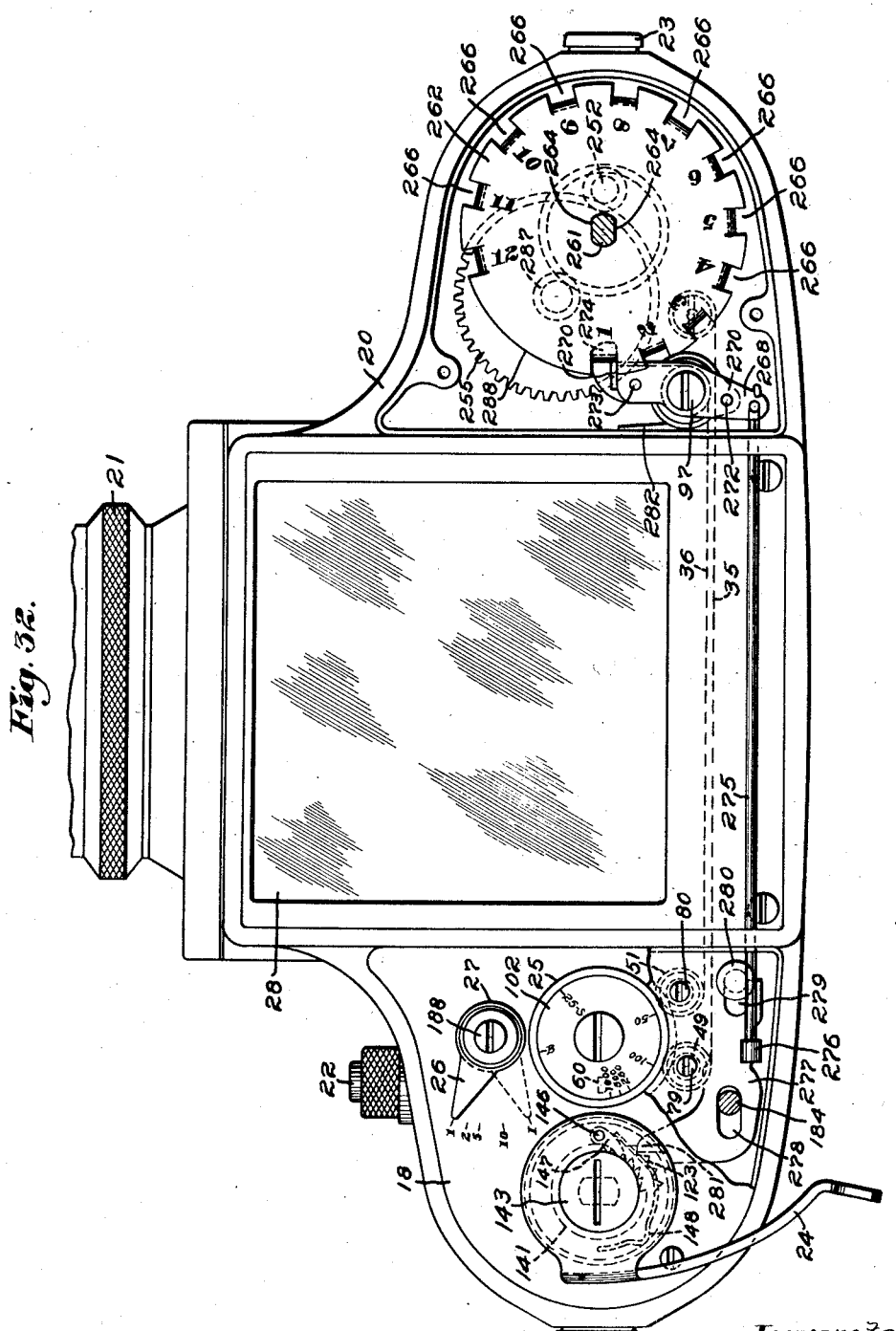
Fig. 32 is a top plan view of the camera with the film feed mechanism cover removed to show the film feed mechanism, a part of the shutter mechanism cover having been broken away to show the interlock between film winding mechanism and film feed mechanism.

Again referring to Fig. 14, the said film winding knob 140 is keyed to shaft 119 by means of the said flats 121, 121 on shaft 119 and the hole in knob 140 to engage therewith. Also engaging said flats 121, 121 is a ratchet plate 141 and a spacing washer 142. Said sleeve 122, knob 140, ratchet 141 and spacer 142 are clamped to the shaft 119 by means of shoulder screw 143. The shoulder portion 144 of shoulder screw 143 has sufficient length to allow winding lever 24 (Fig. 1) to rotate freely thereon. A ratchet pawl plate 145 is free to rotate about the spacing washer 142, but it has riveted thereto a pin 146 which, as best shown in Fig. 32, carries ratchet pawl 147 engaging film winding lever 24. A spring 148 holds ratchet pawl 147 in engagement with ratchet 141. It will be seen that any movement of the film winding lever 24 in a clockwise direction will cause the winding knob 140 to be also turned in a clockwise direction, but when said film winding lever 24 is moved in a contraclockwise direction, no motion of knob 140 will take place.

The purpose of the structure just described is to enable the operator to rewind the shutter at the same time that a film spool is turned for winding or feeding the film. Since it will always be necessary to turn the film spool a greater distance than the shutter rewinding mechanism, it is necessary to provide a clutch means, one construction of which I have set forth.

*Combined film winding and shutter winding.*—As previously stated mainly with reference to Fig. 9, the pivot plate 115 carrying gears 112 and 113 (Fig. 12) is mounted on the ratchet sleeve 122. The pinion 113 meshes with the shutter drive gear 114 and pinion 112 which in turn meshes with shutter winding gear 50. Spring 118 causes said pivot plate 115 to rotate in a clockwise direction, thus holding pinion 112 in mesh with gear 50. As the film winding lever 24 is rotated in a clockwise direction, the shutter drive gear 114 is also caused to rotate in a clockwise direction and through pinions 112 and 113 the curtain gear 50 is caused to turn in a contraclockwise direction until said gear 50 is in position shown in Fig. 9. This will complete the shutter winding and any further motion of the film winding lever 24 can only take place through the slippage of clutch member 139, because said curtain gear 50 is prevented from turning by reason of the dog 109 of lever 110 engaging slot 55 of the cam plate 54. However, it is necessary further to wind the film spool, which is engaged by shaft end 31 or shaft 119 having the key 32 for engaging the slots in the take-up spool. The motion of film winding lever 24 is continued until sufficient film has been wound on the film take-up spool to provide an area for the next exposure, after which all motion of the film winding knob 140 is arrested through ratchet plate 123 by means to be more fully described presently.

*Mirror movement (not herein claimed.)*—The camera is also provided with a mirror frame 149, shown in the set position in Fig. 14 and in the released position in dotted lines Fig. 17, and again in the set position in dotted lines Fig. 19. As shown in Fig. 14, the mirror frame 149 is provided with an angle plate 150 for holding the mirror in set position. Said mirror frame is provided with a hinge portion 151 and a spacer 152 having a pin 153 passing therethrough and through camera walls 72, 73 to provide a pivot for said mirror frame, which is spring-loaded by spring 153a (Fig. 17) to cause it normally to turn in an upward direction so that when the mirror is released, it will move upward into position shown in Fig. 17.

Figure 15:
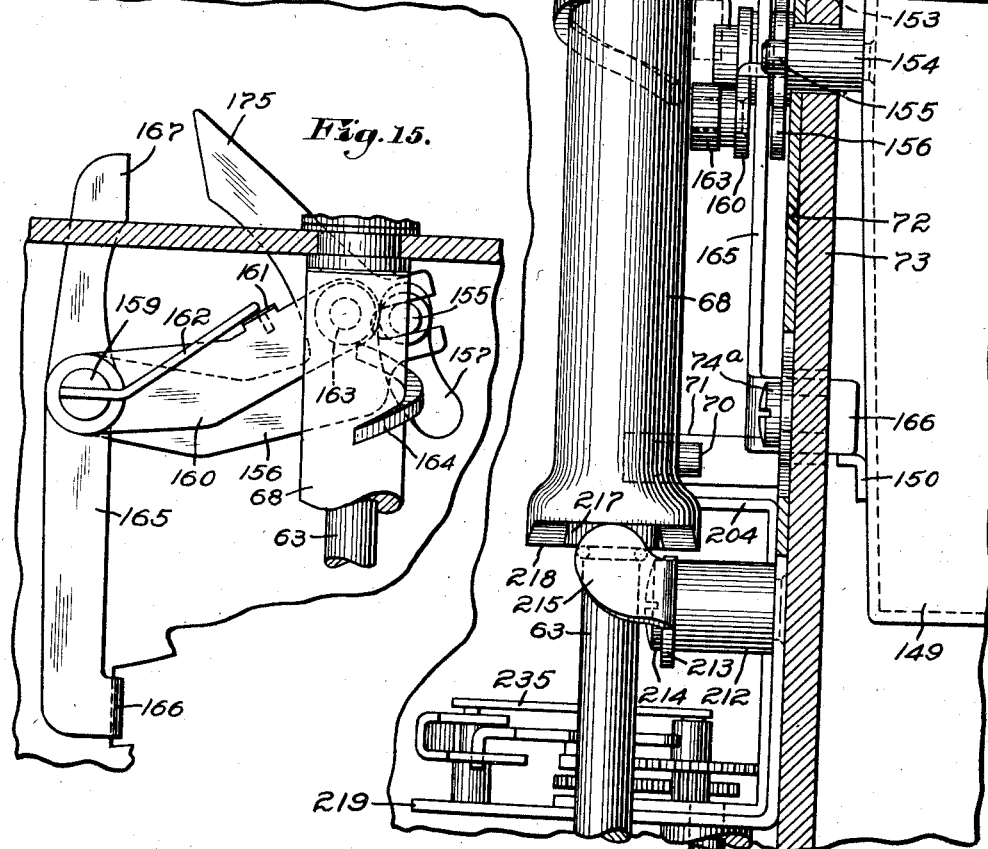
Fig. 15 is an enlarged sectional detail of the mirror release lever and the mirror reset mechanism.

The mirror frame is also provided with a stud 154 which passes through the camera wall 73. The said stud is provided with a reduced end portion 155 which engages mirror reset arm 156, most clearly shown in Figs. 15, 17 and 19. An opening 157 in the camera wall 73 allows mirror stud 154 to travel through an arc of approximately ninety degrees. Said arm 156 is provided with an elongated slot 158 (Fig. 19) for engaging pin 155 of stud 154. Thus any motion of the arm 156 will be transmitted to the mirror frame 149. Said arm 156 is pivoted on a shoulder stud 159, shown in Figs. 15, 17 and 19. Also pivoted on shoulder stud 159 is a second arm 160 having a bent-over portion 161 which is engaged by spring 162 tending to cause arm 160 to rotate in a clockwise direction until the bent-over portion 161 engages arm 156, thus causing any motion in a clockwise direction of arm 160 to be transmitted to arm 156. Said arm 160 is also provided with a stud 163 which is engaged by mirror reset cam 164, most clearly shown in Figs. 13, 14 and 15, the purpose of which is to cause the mirror frame 149 to be reset when the shutter curtain is rewound. This will be more fully described after I have described the manner of making an exposure. A third lever 165 is also pivoted on stud 159 having an inwardly turned portion 166 passing through opening 166a (Fig. 19) in the camera wall and an upwardly extending arm 167 passing through an opening 167a (Fig. 9) in the mechanism-bottom-plate. The purpose of the inwardly extending portion 166 is to hold the mirror in set position as in Fig. 19. Said lever 165 is caused to rotate in a clockwise direction about pivot 159 under the influence of spring 168.

*Instantaneous exposure.*—I will now describe the manner of making an instantaneous exposure for which the shutter setting knob 25 and dial 102 will be in the position shown in Fig. 8. The shutter control mechanism will be in the set condition shown in Fig. 9. Pressure on shutter release knob 22, having a shaft 169 and a washer 170, will engage bell cranks 171 and 172. Bell crank 171 is mounted on a shoulder screw 173 and bell crank 172 is mounted on a shoulder screw 174. Bell crank 171 will be caused to rotate in a contraclockwise direction and bell crank 172 in a clockwise direction. When bell crank 171 is caused to rotate in a contraclockwise direction, arm 167 is caused to be moved forward, thus swinging on pivot 159 to the position shown in Fig. 17, thus disengaging inwardly turned end 166 (Fig. 14) from angle plate 150 of mirror frame 149, allowing said mirror frame to swing up to the position shown in Fig. 17. As the mirror frame 149 swings up, the stud 154 is carried therewith, causing the arm 156 to be carried with said stud through the engagement of pin 155 until it reaches the position shown in Figs. 15 and 17. The arm 156 is provided with a part 175 (Figs. 16 and 19) which engages an arm 176 of the shutter release lever 110. Thus the dog or projection 109 of said lever 110 is withdrawn from slot 55 of the cam plate 54. Prior to this action of the mirror frame 149, the bell crank 172 is also rotated about its axis at shoulder screw 174. Said bell crank 172 is provided with a cam shaped end 177, most clearly shown in detail in Fig. 39, the purpose of which is to engage the stud 127 of rocker plate 126, shown best in Figs. 22, 23 and 39.

The rocker plate 126, whose mounting has previously been described, is caused to rotate in a contraclockwise direction carrying with it the upturned end 129 which engages upturned end 117 (Fig. 12), causing gear pivot plate 115 also to be rotated in a contraclockwise direction, thus disengaging pinion 112 from curtain-winding gear 50. This action takes place prior to the releasing of said mirror frame 149. This is necessary in order that gear 50 will be free to rotate when dog 109 of lever 110 is disengaged by extending arm 175, which is actuated by the mirror frame 149, as previously described.

When the arm 175, which passes through the slot 179 of the mechanism bed plate 65, contacts with the arm 176, thrusting lever 110 in a forward direction, it disengages dog 109 from slot 55 in the cam plate 54, thus allowing curtain winding gear 50 to rotate. At the time the pinion 112 became disengaged from curtain winding gear 50, the upturned end 130 of the rocker plate 126 was also carried in a contraclockwise direction away from the horn-like end 180 of a lever 181, most clearly shown in detail in Figs. 10 and 11, and constituting the second curtain release lever. Said lever 181 is of a folded sheet metal structure really forming three arms, namely, arm 180 previously referred to, disengaging arm 182 and dog 183, the whole being pivoted on screw 184 and being under the influence of spring 185, shown in Fig. 23. When the button 22 was pressed as previously described and rocker plate 126 was caused to move in a contraclockwise direction allowing horn-shaped arm 180 to move in a contraclockwise direction, the dog 183 was permitted also to move in a clockwise direction and to engage pin 60 of curtain winding gear 52, as most clearly shown in Fig. 16. The mechanism will now be in the position shown in Fig. 16, wherein the curtain winding gear 50 carrying cam plate 54 has turned through a partial revolution and carried with it pin 104, which on further turning will engage said lever end 182, causing dog 183 to be removed from the face of pin 60 of curtain winding gear 52, thus allowing the second curtain 35A to close. The setting just described is for a wide opening (that is, the greatest possible slot width), and it is with this slot width that the 1/25th second exposure takes place.

It will clearly be seen that if pin 104 is set to engage any one of the other index holes 105, 105 of the cam plate 54, the arm 182 of lever 181 will be caused to be thrust outwardly at an earlier time, thus releasing the second curtain 35A at a shorter interval after the release of the first curtain 35, and thereby providing a narrower aperture in the curtain structure.

If, for example, the pin 104 were in the position shown in Figs. 26 and 27, the shortest aperture would be provided. That is, the second curtain 35A would be released almost as soon as the first curtain 35 gets in motion, thus providing a very narrow aperture and a very high shutter speed. If, however, pin 104 were set in the location of index holes 105, the curtain release pin 104 would never contact with the arm 182 of lever 181, because curtain winding gear 50 and cam plate 54 would be stopped before pin 104 reached contact arm 182, by reason of the dog 70 of the cam member 68 striking stop 71, as shown in Fig. 17. Therefore, the pin 104 under such conditions would not release the second curtain 35A. The first curtain 35 would run all the way down and leave the aperture fully open and the second curtain 35A would be held wound up on the curtain roller 39, thus providing a full aperture. An exposure would take place and continue until exposure button 22 is released. Rocker plate or arm 126 would thereupon be caused to move in a clockwise direction under the influence of spring 132 against upturned end 129 of the bulb exposure rocker arm or operating plate 126, which would cause the cam face 130 thereof to thrust lever arm 180 outwardly, thus disengaging dog 183 from pin 60 of the curtain winding gear 52, and allowing the second curtain 35A to close. This type of exposure is commonly called a "bulb" exposure. The structure of bulb exposure rocker arm 126 (Fig. 22) and gear pivot plate 115 (Fig. 12) with upturned end 117, engaged by upturned end 130 when rocker arm 126 is moved in a contraclockwise direction, is provided to allow rocker arm 126 to return to starting position, whereupon gear pivot plate 115 will be returned to its starting position under the influence of spring 118, causing gear 112 to mesh with curtain winding gear 50. The dog 103 will nevertheless engage pin 90 even though pinion 112 does not fall into mesh with curtain winding gear 50.

As curtain winding gear 50 is released and allowed to turn in a clockwise direction, it allows the first curtain 35 to run down, the shaft 63 turning with gear 50, and cam member 68, in turning, carries with it the cam 164. Since mirror frame 149 was in its upper position before curtain gear 50 started to rotate, roller 163 will be in position shown in Fig. 15, and as said cam member 68 revolves in a clockwise direction, its cam 164 will raise roller 163, thus causing it to pass over the top surface of cam 164. Said roller 163 on lever 160 can move upward away from lever 156 under the influence of spring 162, thus allowing cam 164 to pass under roller 163 while the mirror is in the raised position. This action is most clearly shown in Fig. 15.

*Snubber or cushioning action.*—The action of cam 164 in raising roller 163 also serves as a snubber on the first curtain 35. A gradually increasing pressure is introduced by the tensioning of spring 162 as the cam 164 passes under the roller 163. After said cam 164 has completely passed roller 163, said lever 160 returns to its position shown in Figs. 17 and 18.

The mechanism is now in the position shown in Figs. 17, 18 and 21, wherein the mirror frame 149 is in the "up" position; curtain winding gears 50 and 52 have allowed the curtains 35 and 35A to run all the way across and pinion 112 is again engaged with curtain winding gear 52 under the influence of spring 118 and the upturned end 117 of pivot member 115 which, as stated, carries pinions 112 and 113.

*Second exposure.*—Before a second exposure can be made, it is necessary to restore the shutter mechanism to the condition shown in Fig. 9 and at the same time to rewind or feed a new supply of film. This is done in the following manner.

Rewind lever 24 (Figs. 1 and 32) is moved in a clockwise direction and then returned, and this motion is repeated until said lever can be moved no further in a clockwise direction. When said lever 24 is moved in a clockwise direction, gear 114 (see Fig. 21) is thereby caused to rotate in a clockwise direction, driving pinion 113 in a contraclockwise direction, pinion 112 in a clockwise direction, and curtain winding gear 50 in a contraclockwise direction. This motion will continue until curtain winding gear 50 and cam plate 54 are returned to the position shown in Fig. 9, wherein dog 109 of lever 110 will drop into notch 55 of cam plate 54, thus stopping curtain winding gear 50 from turning further. Said gear 50 carries a stud or pin 56, shown in section in Fig. 7, and the curtain winding gear 52 carries a stud or pin 59. As the curtain winding gear 50 advances in a contraclockwise direction carrying with it stud 56, said stud will contact with stud 59 or curtain winding gear 52, carrying said gear 52 along with said gear 50 until the condition results shown in Fig. 9. Thus both curtains 35 and 35A have been restored to the closed position. When the said curtains have run all the way down, there will be a space separating stud 56 from stud 59. This space is sufficient to allow said first curtain 35 to overlie said second curtain 35A so that, when said curtains 35 and 35A are returned to the fully wound position, they will overlie or "cap" as the curtain passes the exposure opening.

As the curtain winding gear 50 was first turned in a clockwise direction, the mirror frame 149 was in the position shown in Fig. 17. Levers 156 and 160 are also in the position there shown, and cam member 68 and cam 164 were in the position shown in Fig. 17 and also in Fig. 18 wherein dog or lobe 70 on cam member 68 is in contact with bracket 71 on the camera wall 72.

As the curtain winding gear 50 continued to rotate, the shaft 63 was turned with gear 50 by means previously described, thus rotating cam member 68 having cam 164 (Fig. 14). The forward end of said cam 164 thus passed over the top of the roller 163, thus camming down levers 160 and 156 and the mirror frame 149 to the position shown in Figs. 14 and 19 through the agency of roller 163, lever 160, the turned-over portion 161, lever 156, and pin 154 on stud 155. The shutter mechanism and the mirror frame 149 will now be restored to proper condition for a second exposure. It is to be understood, however, that I have not yet described the manner in which forward motion of the lever 24 is stopped after the shutter has been rewound. This I will do after describing the slow shutter speeds.

*Slow shutter speed.*—I have previously referred to the slow shutter speed knob 27 and the slow shutter speed pointer 26, shown in Fig. 1. On shutter plate 18, Fig. 1, I have provided a series of numerals,—1 designating one second, 2 designating ½ second, 5 designating ⅕ second, and 10 designating ⅒ second. "1" is a setting for all instantaneous speeds. For all speeds thus far described, the slow shutter speed pointer 26 was in the position of "1," which is the position the parts occupy in Fig. 27. For the so-called slow shutter speeds or those speeds wherein a time delay is introduced between the instant the first curtain 35 is released and the second curtain 35A is released, the shutter setting dial 102 and shutter setting knob will be positioned as in Fig. 8, with the index pointer 102 opposite 25–S of the slow shutter speed dial 102.

Fig. 28 clearly shows the construction of the slow shutter speed knob 27, and the pointer 26 with its related parts. Said knob 27 is mounted on a shaft 187 by means of fillister head screw 188. Said knob 27 is provided with a notch 189 and the slow shutter speed pointer 26 is provided with an upturned key 190. The shaft 187 is provided with an enlarged upper end 191 with flats 192 which engage an index plate 193. The shaft 187 passes through shutter cover plate 18 (Fig. 1) and has attached to its lower end a boss 194 which has an enlarged flange 195 provided with extending prongs 196, 196. The boss 194 passes through a hole in the mechanism-housing lower plate 65. The index plate 193 is provided with a raised conical portion 197 to engage a series of indentations 198, 198 of the shutter cover plate 18. One indentation is provided for each position of the slow shutter speed pointer 26, as indicated in Fig. 27. The purpose of this construction is to provide a lock to hold the pointer 26 in any of the selected positions.

Figure 31:
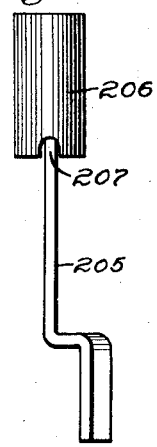
Fig. 31 is an enlarged detail of a part of the slow shutter speed control member.

In Fig. 19 is shown that portion of the slow shutter speed operating mechanism that is below the lower shutter plate 65. Therein is shown at 199 a shutter retarding lever having an upturned end 200. A detail of said lever 199 is shown in Fig. 25. It is provided with two cutouts forming sectors 201, 201. The said lever is riveted to shaft 202, as most clearly shown in Figs. 17, 19 and 28. The said shaft 202 is provided with an upper bearing 203 and a lower bearing 204, which are formed of angle plates riveted to the mechanism plate 72. On the lower end of shaft 202 is provided a member 205, shown in detail in Fig. 31, as provided with a hub 206 having a notch 207 overlying a pin 208 of shaft 202, thus keying the member 205 to said shaft 202. Said pin 208 is shown in position in Fig. 19 and in dotted lines Fig. 17. A spiral spring 209 having a hook end 210 is hooked on the upper bearing 203, and it has a turned-down end 111 which over-rides member 205, as shown in Fig. 17.

The spring 209 is both an expanding spring and a torsional spring,—that is, shaft 202 is thrust downward by said spring 209 and member 205, and is also turned in a clockwise direction thereby. To the mechanism-plate 72 is attached a boss 212, as shown in Fig. 14, to which latter is attached a rocker arm 213, best shown in Figs. 17 and 19, being attached to said boss 212 by a shoulder screw 214 and being free to rock thereon. The outer end of rocker arm 213 is provided with a bent-over portion having a rounded upper face 215, the shape of which is most clearly shown in Fig. 14. The opposite end of the said rocker arm 213 is provided with a bent-out end 216 which underlies the rounded end of shaft 202. On the said face 215 rides the lower end of cam member 68 which has a cut-away portion 217 (shown in Figs. 14, 17, 19 and 20) forming a cam for operating the rocker arm 213. The position of said cut-out portion 217 of cam member 68 is such that when the first curtain 35 has run all the way down, the end 215 of said rocker arm 213 rides up on the surface 218 of cam member 68, as shown in Fig. 17, thus raising shaft 202 against spring 209 and retarding lever 199. The upturned end 200 is now in position in front of pin 61, as clearly shown in Fig. 17.

This cycle is so timed that said upturned end 200 is raised into the described position in relation to pin 61 just before the dog 183 (Figs. 9 and 10) is retracted from pin 60. It will readily be seen that if pin 104 were located in any other of the index holes 105 than in the one provided for a 25th second or slow position, said dog 183 would have been thrust away from pin 60 before said upturned end 200 was brought into position in front of pin 61. The purpose of this construction is to guard against the retarding action of the shutter curtain, so that only the second curtain 35A will be retarded when the curtains are set for the widest slot.

Figure 29:
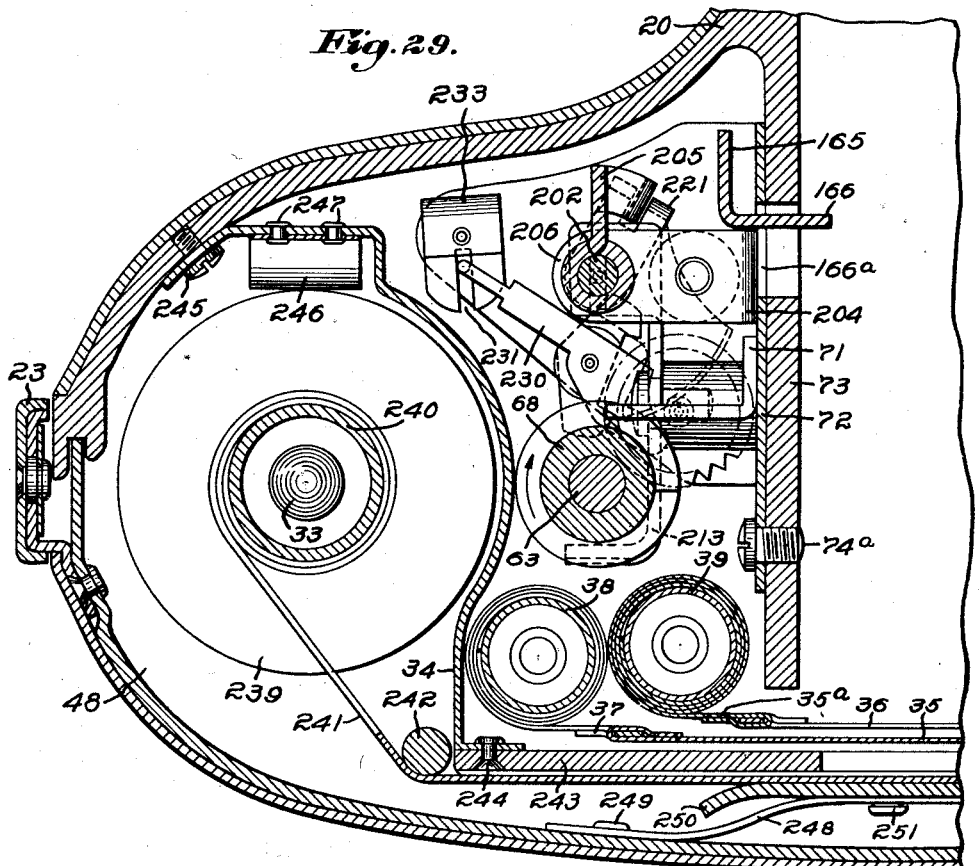
Fig. 29 is a vertical section through the camera showing the curtain rollers, the film rewind spool in section and the slow shutter speed retarding mechanism.
Figure 30:
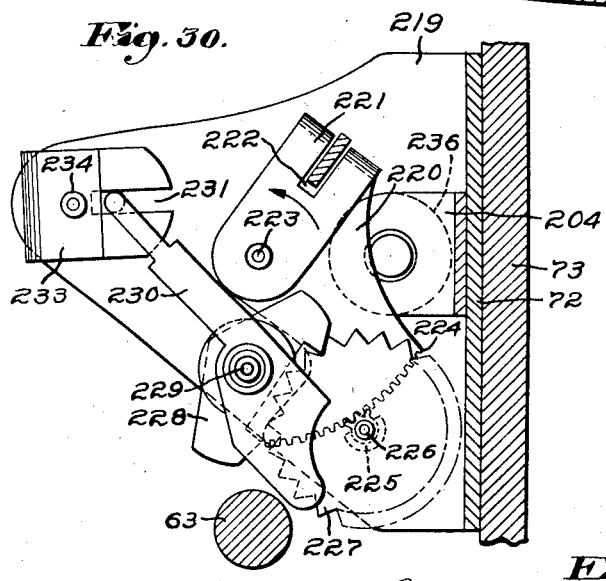
Fig. 30 is an enlarged plan view of the shutter slow speed retarding mechanism.

*Slow shutter speed retarding mechanism.*— Mechanism-plate 72 has its lower end bent out at right angles forming a shelf 219, most clearly shown in Figs. 19, 29 and 30. Mounted on the shelf 219 is the retarding mechanism which consists of a sector member 220 and sector arm 221 having a slot 222 into which the lower end of member 205 engages. Said sector arm 220 is pivoted on a shaft 223 and is free to rotate thereon; it is provided on its outer end with a series of gear teeth 224 which mesh with pinion 225 mounted on shaft 226. Also mounted on shaft 226 is a star wheel 227, which is engaged by an escapement plate 228 mounted on a shaft 229. Also attached to shaft 229 and caused to move with escapement plate 228, is an oscillating member 230 having one end bent downward to engage a slot 231 of inertia-member 233 mounted on a shaft 234. The said mechanism is also provided with a top bearing plate 235, most clearly shown in Figs. 17 and 19.

It will be evident that any motion of member 205 in a rotary direction around pivot 223 will cause the sector member 220 to be oscillated on shaft 223, and since said sector member 220 is provided with gear teeth 224 meshing with pinion 225, star wheel 227 will be caused to rotate. The escapement 228 is so constructed that as star wheel 227 rotates, oscillating member 230 is caused to move so as to turn to oscillate inertia-member 233. This action puts a definite load upon sector 220 causing retarding action to be transmitted through member 205, shaft 202 and retarding lever 199.

The platform member 219 is also supported from the bottom of the camera by support member 236. Since the retarding lever 199 (Fig. 25) is provided with the two cut-out sectors 201, and the shutter speed control mechanism is provided with two fingers 196, 196, which are positioned as clearly shown in Fig. 24 in dotted lines, the distance the retarding lever 199 can travel in a clockwise direction under the action of spring 209 is determined by the setting of slow shutter speed pointer 26. Since fingers 196, 196 are controlled by the slow shutter speed point 26, this position with respect to sectors 201 is definitely determined. Spring 209 tends to cause retarding lever 199 to travel in a clockwise direction until one end of sector 201 is stopped by a finger 196. Fingers 196 can be changed in position so that the upturned end 200 of retarding lever 199 can be set to engage pin 61 immediately after curtain winding gear 52 has been released, thus providing the longest shutter opening. If retarding lever 199 is so positioned that pin 61 barely contacts with the upturned end 200, thus moving lever 199 only slightly, a very short retardation of curtain winding gear 52 will take place.

Any one of the intermediate speeds is provided for by the series of holes 105 in the cam plate 54, thus providing any pre-selected time lag between the instant the first curtain 35 is released and the instant the second curtain 35A is released. After pin 61 has passed said upturned end 200 of the retarding lever 199, said lever with its upturned end 200 is then returned to the starting position under the influence of spring 209. When the retarding lever 199 is in position for the longest exposure, it will be in the position shown in dotted lines, Figs. 8 and 16. When the slow shutter speed control finger 26 is set for "instantaneous," said retarding lever 199 and its upturned end 200 will be in the position shown in Fig. 27, so that pin 61 does not contact with upturned end 200 as curtain winding gear 52 and the second curtain 35A is allowed to run down. Thus no retarding action is provided at such time.

The operation of the several slow shutter speeds is exactly the same as for an instantaneous exposure excepting that either index 106 or shutter knob 25 is set to the position 25-S on shutter setting dial 102 and the slow shutter speed finger 26 is set to the speed desired. The button 22 is released in the usual manner for making an exposure.

The mirror frame 149 swings up and causes the first curtain 35 to be released in the same manner as for instantaneous exposure. As said first curtain 35 runs down, pin 104 contacts with arm 122, thereby disengaging dog 183 from the pin 60.

Just prior to this, the shaft 202 was raised under the influence of cam face 216 and lever 213, so that the upturned end 206 was brought in position in front of pin 61, and so that even though the second curtain winding gear 52 of the second curtain 35A was released, said gear 52 cannot rotate until it has caused retarding lever 199 to move out of the path of pin 61.

*Film feeding and shutter interlock.*—The film feeding and shutter interlock mechanism will next be described.

To load the camera, a film cartridge of standard manufacture is placed in film chamber 47 (Fig. 2) over shaft end 43 and shaft key 44. The spool of the cartridge is held central with stud 45 mounted on a spring hinge (not shown). An empty spool is placed in take-up film chamber 48 in a similar manner, and the film on the spool in film chamber 47 is led across the back of the camera and engaged with the spool in take-up film chamber 48. The cover 238 is then replaced. The structure of the film chambers is most clearly shown in Fig. 29, the take-up chamber only being there shown. The take-off chamber is of similar construction. The film spool flange is shown at 239. The film spool is, of course, provided with flanges on both sides of the film strip. The film spool core is shown at 240 and the film at 241 as passing over an idler 242, and across the camera back plate 243 riveted to the film chamber housing 34 by rivets 244. The film chamber housing is also connected to the camera housing 20 by screws 245. Attached to the film housing is a pressure spring 246 held in place by rivets 247, 247. Attached to the camera cover 238 is a spring 248 by means of rivets 249. The purpose of said spring 248 is to hold a pressure plate 250 in contact with the film strip 241. The said pressure plate 250 is held to spring 248 by shoulder rivet 251. The camera back cover 238 is provided with the usual slide locks designated as 23 in several of the figures, particularly Figs. 1 and 29. As previously stated, the structure of the other half of the camera is not shown in Fig. 29, but is substantially the same.

It was previously pointed out that as lever 24 (Fig. 1) is rocked forward and back, the film 241 is caused to wind up on the film spool core 240 (Fig. 29) at the same time that the shutter is rewound and that it is necessary to continue winding film even though the shutter is completely wound, so as to advance the film a sufficient distance to expose a new surface thereof for the exposure opening, and when sufficient film has been advanced, forward motion of lever 24 is arrested. I will now describe the means for doing this.

Figure 35:
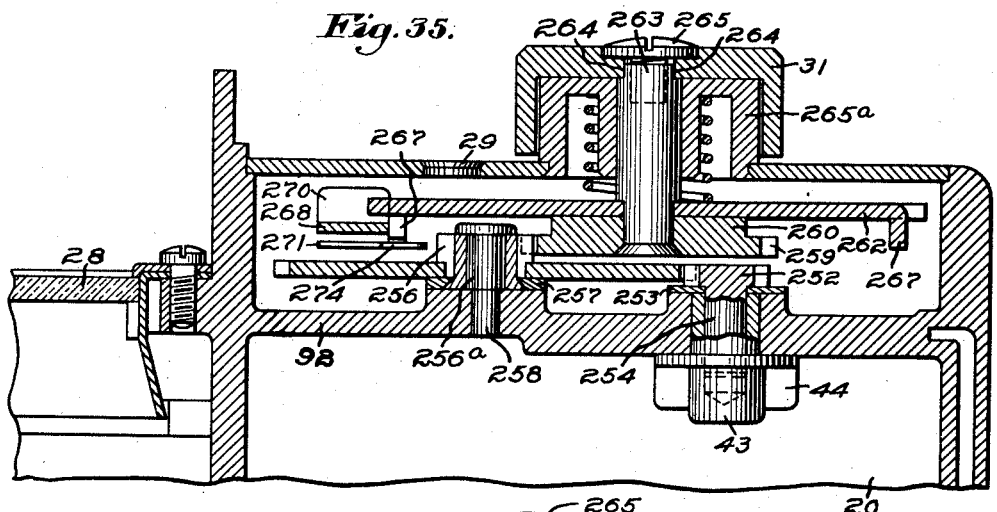
Fig. 35 is a vertical transverse section through the film measuring mechanism.

As clearly shown in Fig. 35, the shaft 43 has a key 44 onto which the take-up spool is fitted. Said shaft 43 passes through the camera wall or casting 92 and has a pinion 252 attached thereto. Under said pinion 252 is a spacing washer 253, and the pinion 252 has a knurled surface 254 pressed into a hole in shaft 43. Said pinion 252 meshes with a gear 255 which has a pinion 256 forming a hub on gear 255. A washer 257 is riveted to pinion 256, thus forming a short hub at the under side of gear 255, which rotates around a shaft 256a fastened into the casting 92 and prevented from turning therein by a knurled portion 258. Said pinion 256 meshes with a gear 259 having a hub 260. On the upper surface of said gear hub 260 is placed an index plate 262. A shaft 261 with a reduced end 263 passes through a hole in the index plate 262 and a hole in gear 259 and is riveted thereto, thus holding gear 259, index plate 262 and shaft 261 as an integral unit. The upper end of said shaft 261 is provided with flats 264, 264 over which the knob 30 is fitted, it having a hole so shaped as to fit the said shaft flats 264, 264. The knob 30 is held in place by a fillister head screw 265. The measuring mechanism cover 19 is provided with a hub 266 through which shaft 261 passes.

A spring 267a rides in a slot over hub 265a and presses downwardly onto index plate 262. This structure provides means for setting index plate 262 at any predetermined point by raising knob 30, thus disengaging gear 259 from pinion 256, and allowing knob 30 to be turned together with index plate 262. Said index plate 262 is provided with a series of notches 266, 266, most clearly shown in Fig. 32. These notches are provided with numbers from 1 to 12, each representing an exposure area on the film. At the position of each notch is a turned-down lip or tooth 267, most clearly shown in Fig. 36 and in detail in Figs. 33 and 34.

Figure 36:
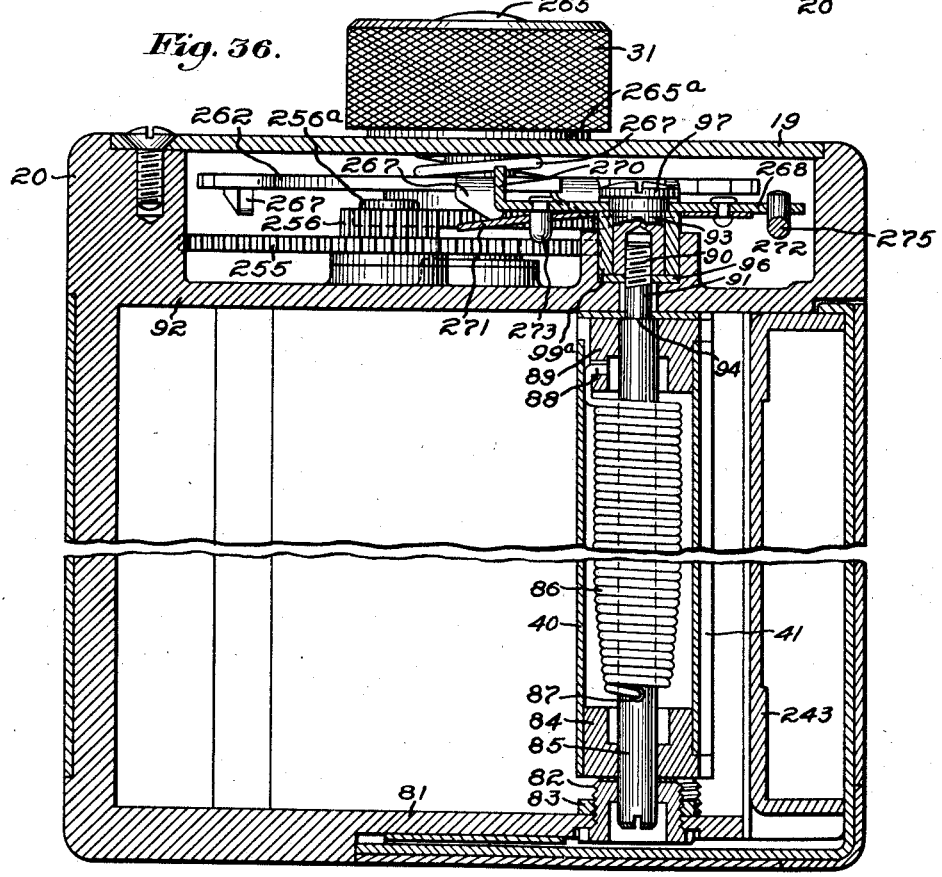
Fig. 36 is a vertical transverse section through one of the curtain rollers, showing the film measuring mechanism.

On the shoulder screw 97 (Figs. 32, 37, 38) is pivoted a lever 268 having a hole 269 and also having an upturned end 270 (Figs. 33, 34). To the under side of lever 268 is secured by rivet 272 a spring 271 (Figs. 33, 36) which is provided with a clearance hole to clear the bushing 99a (Fig. 36). The forward end of spring 271 is prevented from moving laterally by means of a pin 273 (Figs. 36, 37, 38) passing through a hole in spring 271, which is allowed to move downward away from lever 269 when riding over turned-down portions 267. Said spring 271 is provided with an extending lip 274, Fig. 37, also shown in dotted lines in Fig. 38. Through the hole 269 of the lever 268 passes an upturned end of a shaft 275, which passes across the back of the camera and is threaded into a bushing 276 of the locking plate 277, as most clearly shown in Figs. 32 and 36. Said locking plate 277 is provided with a slot 278 through which the shoulder screw 184 passes, and with a second slot 279 through which shoulder screw 280 passes. Said locking plate 277 is free to slide horizontally under the control of lever 268 and pin 128 of the rocking member 126. As shown in Fig. 9, the locking pin is in such a position that it is about to move locking plate 277 to the right. The latter is provided with an extending arm having a point 281 which engages ratchet 123 as shown in Fig. 9, wherein locking plate 277 has been moved all the way to the left, thus causing point 281 thereof to engage teeth of ratchet 123. Said locking plate 277 has been caused to move to the left under the influence of spring 282, shown in Fig. 32, which has caused lever 268 to move in a clockwise direction and upturned end 270 has entered the No. 1 slot of the index plate 262. The motion of lever 268 is transmitted to the locking plate 277 by said shaft 275, as most clearly shown in Fig. 32. The said ratchet 123 is now locked and is prevented from turning in a clockwise direction. A dog 283, shown in Fig. 9, is provided to prevent ratchet 123 from turning in a contraclockwise direction. Said dog 283 is pivoted on a stud 284, having nut 286 to hold it in place, and is caused to move in a clockwise direction under the influence of a spring 285.

*The operation of the measuring device.*—After having placed a spool of film in the supply chamber and threaded the film onto the empty spool in the take-up chamber and the camera back is replaced, the shutter release button 22 is pressed, causing locking member 277 to be moved to the right in a manner previously described. This will cause shaft 275 to be also moved to the right and lever 268 to be swung in a contraclockwise direction, thus disengaging upturned end 270 from any one of the slots 266 in which it may be engaged. The knob 30 is then raised and turned until zero marking 287 (Fig. 37) on index plate 262 appears under hole 29 in plate 19 (Fig. 1). The lever 24 can now be operated until No. 1 on film strip appears under the ruby window (not shown) in the camera back cover 238. When No. 1 on the film appears, knob 30 is again raised and numeral No. 1 of index plate 266 is placed under peep hole 29 in plate 19. The camera is now in position for making the first exposure. As the lever 24 is operated, the shutter is rewound, and the mirror is reset. It has just been described how the first exposure area of the film strip is put in position for the first exposure. The mechanism will now be positioned as in Fig. 32, wherein the upturned end 270 of the lever 268 will be in notch 226 opposite the numeral No. 1, and locking plate 277 having the point 281 will engage one of the teeth of ratchet 123. Thus no further winding or operation of lever 24 (Fig. 1) in a clockwise direction can take place until after an exposure is made.

In making an exposure, button 22 is pressed, releasing the mirror frame 149, and allowing the shutter to operate. At the same time button 22 is pressed, the locking plate 277 is moved to the right in the manner previously described, withdrawing the upturned end 270 of lever 268 from slot 266 and dog 281 from the ratchet 123. The spring end 274 underlies one of the turned-down lips or teeth 267, as shown in Fig. 35. When the locking plate 277 was moved to the right, the shaft 275 was also moved to the right, swinging lever 268 in a contraclockwise direction, withdrawing the upturned end 270 from slot 266, and pulling spring end 274 past the downturned lip 267. The spring end 274 then snaps into the position shown in Fig. 33, holding the upturned end 270 from engaging in slot 266 opposite numeral No. 1, and thus holding the locking plate 277 from engagement with the ratchet 123. The winding lever 24 can now be operated, which will cause some film strip to be wound upon the take-up spool, and the shutter will be rewound and the mirror reset. Since the supply spool will drive shaft 43 through key 44, the pinion 252 will be caused to rotate, rotating gear 255, pinion 256 and gear 259, which is attached to index plate 262, until numeral No. 2 approaches the peep hole 29. Since the downturned lip 267 is provided with an angular face in the direction of rotation, the said lip will over-ride spring 274, forcing it downward, thus allowing the upturned end 270 to drop into slot 266 of the index plate 262 when sufficient film has been wound to cause the said index plate to turn that far. When the said upturned end 270 drops into slot 266 opposite numeral No. 2, the lever 268 will rotate in a clockwise direction under the influence of spring 282, thrusting shaft 275 to the left. The locking member 277 will also be moved to the left, carrying with it pointed end 281 into engagement with one of the teeth of ratchet 123, thus preventing further movement in a clockwise direction of the said winding lever 24.

It can be clearly seen that in this construction a double exposure is impossible, because the shutter cannot be operated until it is rewound and the act of rewinding the shutter also positions a new film supply behind the exposure opening. After sufficient film has been so positioned, no more film can be moved until a second exposure is made. The notches 266 in the index plate 262 are not equally spaced, but are spaced at varying distances so as to compensate for the changed diameter of the film supply spool. Thus an equal amount of film is fed off the supply spool each time the notch 266 is allowed to pass the upturned end 270.

After the twelfth exposure has been made, spring end 274 (Figs. 37 and 38) will hold the upturned end 270 in position to be led onto the solid portion 288 of the index plate 262, thus permitting the winding off of the remaining film and trailer that is still on the take-off spool, by the operation of film winding lever 24.

Although by this invention I have provided an improved camera of reflex construction, many of the novel mechanical features thereof can be applied to cameras of other types such as, for example, a camera not provided with a movable mirror. Also, I have disclosed mechanism for film winding and spacing that can be used in a camera attachment such as a roll holder adapter for plate or film cameras. The shutter mechanism herein disclosed and claimed can also be used in other photographic cameras. I do not in this application claim the mirror operating mechanism, since claims thereto are in a pending divisional application, Serial No. 313,542, filed January 12, 1940, in view of requirement for division.

Having thus described one illustrative embodiment of the invention, it is to be understood that although specific terms are employed, they are used in a generic and descriptive sense and not for purposes of limitation, the scope of the invention being set forth in the following claims.

I claim:

1. A photographic camera having in combination, a casing provided with an objective lens, shutter mechanism including two sliding curtains 35, 35A, take-up rollers therefor respectively provided with winding gears 50 and 52, said gear 52 having rewind pin 59, release pin 60 and slow shutter control pin 61, both carried by said gear 52, holding means for curtain 35A engageable with said release pin 60, stop pin 67 on a fixed support, adapted to be engaged by said pin 61, and retarding mechanism adapted to be engaged by said control pin 61.

2. A photographic camera having in combination, a casing provided with an objective lens, shutter mechanism including two sliding curtains 35, 35A, take-up rollers therefor respectively provided with winding gears 50 and 52, said gear 52 having rewind pin 59, release pin 60 and slow shutter control pin 61, both carried by said winding gear 52, retarding mechanism adapted to be engaged by said control pin 61, stop means positioned to be engaged by said control pin 61, an upright shaft 63 whereon said winding gear 50 is keyed and whereon said winding gear 52 is loose, said winding gear 50 having a pin 56 to engage said rewind pin 59.

3. A photographic camera having in combination, a casing provided with an objective lens, shutter mechanism including two sliding curtains, take-up rollers therefor respectively provided with winding gears 50, 52, having interengageable, relatively variable formations, a shaft whereon said gears are respectively fast and loose, an adjacent shaft 119 and pivot plate 115 rockably supported on said shaft 119 and carrying two meshing idler pinions 112, 113, shutter drive gear 114 meshing with said pinion 113, said pinion 112 being adapted to be brought into meshing relation with the winding gear 52 for said second curtain, to control the operation of the second curtain release means.

4. A combination according to claim 3, but in which said pivot plate 115 is provided with an arm 116a, and in which combination a second curtain release plate 126 is provided, having an arm 127 to co-act with said arm 116a for controlling bulb exposure.

5. A combination according to claim 3, but in which means is provided for controlling the rocking movement of said pivot plate, the latter having an extending arm, and in which combination a second curtain release member is provided having a formation to engage the said arm of said pivot plate.

6. A photographic camera having in combination, a casing provided with an objective lens, shutter mechanism including two sliding curtains, take-up rollers therefor respectively provided with winding gears 50, 52, having interengageable, relatively variable formations, a shaft whereon said gears are respectively fast and loose, and an adjacent film winding shaft 119 having rockably supported pivot plate 115 and also having rocker arm 126 supported on said shaft, second curtain release means, said plate 115 and rocker arm 126 cooperating in the control of said second curtain release means.

7. A photographic camera having in combination, a casing provided with an objective lens, shutter mechanism including two sliding curtains, take-up rollers therefor respectively provided with winding gears 50, 52, having interengageable, relatively variable formations, a shaft whereon said gears are respectively fast and loose, and an adjacent film winding shaft 119 having rockably supported pivot plate 115 and also having rocker arm 126 supported on said shaft, second curtain release means, said plate 115 and rocker arm 126 cooperating in the control of said second curtain release means, and a manually operable member to move said rocker arm 126.

8. A photographic camera having in combination, a casing provided with an objective lens, shutter mechanism including two sliding curtains, take-up rollers therefor respectively provided with winding gears 50, 52, having interengageable, relatively variable formations, a shaft whereon said gears are respectively fast and loose, and an adjacent film winding shaft 119 having rockably supported pivot plate 115 and also having rocker arm 126 supported on said shaft, second curtain release means, said plate 115 and rocker arm 126 cooperating in the control of said second curtain release means, a bell crank lever 172 to rock said rocker arm 126, and a manually operable release button 22 to move said bell crank lever.

9. A photographic camera having in combination, a casing provided with an objective lens, shutter mechanism including two sliding curtains, take-up rollers therefor respectively provided with winding gears 50, 52, having interengageable, relatively variable formations, a shaft whereon said gears are respectively fast and loose, and an adjacent film winding shaft 119 having rockably supported pivot plate 115 and also having rocker arm 126 supported on said shaft, second curtain release means, said plate 115 and rocker arm 126 cooperating in the control of said second curtain release means, an operating button to release the first curtain, a second curtain release lever 181, and a shutter winding knob having an index pin 104 cooperating with said release lever 181 to release said second curtain.

10. A photographic camera having in combination, a casing provided with an objective lens, shutter mechanism including two sliding curtains, take-up rollers therefor respectively provided with winding gears 50 and 52 having interengageable formations, a shaft 63 whereon said winding gears are respectively fast and loose, said gears 50 having an attached cam plate 54 provided with notch 55, and curtain release lever 110 having a formation to engage said notch, said shaft carrying said winding gears, also carrying a cam member adapted to engage a stationary part of the camera structure to limit the motion of the first curtain winding gear 50.

11. A photographic camera having in combination, a casing provided with an objective lens, shutter mechanism including two sliding curtains, take-up rollers therefor respectively provided with winding gears 50 and 52, cam plate 54 secured to gear 50 and having notch 55, a first curtain release lever having a formation to engage said notch, and a shaft whereon said gears are mounted and having a shutter speed knob or dial, movement of which may bring the cam plate 54 into position to be engaged with or disengaged from said curtain release lever, said shaft carrying said winding gears, also carrying a cam member and a stop formation on said cam member, said stop formation being adapted to engage a stationary part of the camera structure to limit the motion of the first curtain winding gear 50.

12. A camera having a casing with an objective lens, a shutter including two slidable curtains, curtain winding gears, a slow-shutter control formation carried by the winding gear for the second curtain, a shutter retarding lever 199 for controlling the slow shutter speed and engageable for that purpose with the slow shutter control formation, an axially movable shaft 202 carrying said lever, and rocker arm 213 having a member to engage shaft 202 and move it axially.

13. A camera having a casing with an objective lens, a shutter including two slidable curtains, a shutter retarding lever 199 for controlling the slow shutter speed and engageable for that purpose with the slow shutter control formation, an axially movable shaft 202 carrying said lever, rocker arm 213 having a member to engage shaft 202 and move it axially, and a shaft having curtain winding gears thereon and also provided with a formation to operate said rocker arm 213, the winding gear for the second curtain having a slow-shutter control formation to be engaged by said lever 199.

14. A camera having a casing with an objective lens, a shutter including two slidable curtains, a shutter retarding lever 199 for controlling the slow shutter speed and engageable for that purpose with the slow shutter control formation, an axially movable shaft 202 carrying said lever, rocker arm 213 having a member to engage shaft 202 and move it axially, a shaft 63 having two curtain winding gears thereon, the winding gear for the second curtain having a slow shutter control formation, said shaft 63 also having a cam member 68 with a cam formation 218 to engage said rocker arm 213 and move the shaft 202 axially for retarding the second curtain for slow shutter speed.

15. A camera having a shutter including two slidable curtains 35, 35A, curtain winding gears for said curtains respectively, the winding gear for the second curtain having thereon a slow shutter control formation, a shaft 62 carrying said gears and having a cam formation 218, a shaft 202 having a shutter retarding lever 199 for controlling the slow shutter speed and engageable for that purpose with the slow shutter control formation, and rocker arm 213 extending beneath said shaft 202 and operated by said cam formation 218, to move said shaft 202 axially.

16. A camera having a shutter including two slidable curtains 35, 35A, curtain winding gears for said curtains respectively, the winding gear for the second curtain having thereon a slow shutter control formation, a shaft 62 carrying said gears and having a cam formation 218, a shaft 202 having a shutter retarding lever 199 for controlling the slow shutter speed and engageable for that purpose with the slow shutter control formation, and rocker arm 213 extending beneath said shaft 202 and operated by said cam formation 218 to move said shaft 202 axially, the construction being such that when curtain 35 is all the way down, the rocker arm 213 moves shaft 202 axially to bring the shutter retarding lever into position to retard the curtain 35A.

17. A camera having a shutter including two curtains and slow shutter speed retarding mechanism therefor including an inertia member, a sector member 220 having teeth 224 in train with said inertia member, pivotally mounted sector arm 221 having a slot 222, a shaft 202 having a member 205 received in said slot 222, a retarding lever 199 secured to said shaft 202, a rocker arm 213, a cam member 88 having a cam formation 218 to cooperate with one part of said rocker arm 213, said rocker arm and said cam formation being so positioned with respect to said shaft 202 as to cause said shaft and said retarding lever to be moved in a direction axially of said shaft by said cam formation at approximately the end of the first-curtain travel.

18. A camera having a shutter including two curtains and slow shutter speed retarding mechanism therefor including as a sub-combination, an inertia shaft member 223, gearing controlled thereby, and which is operatively connected with the shutter mechanism, shutter retarding lever 199, a shaft 202 carrying the same, said lever 199 having cut-out formations 201, a slow shutter speed knob, and a shaft 187 carrying the same and provided with fingers 196 for co-acting with said cut-out formations 201 to determine the position of said retarding lever 199.

EDSON S. HINELINE.